(12) United States Patent
Tsuruta et al.

(10) Patent No.: US 8,224,169 B2
(45) Date of Patent: Jul. 17, 2012

(54) OPTICAL UNIT WITH SHAKE CORRECTING FUNCTION

(75) Inventors: Toshifumi Tsuruta, Nagano (JP); Kiyoshi Miyazaki, Nagano (JP); Tadashi Takeda, Nagano (JP); Hisahiro Ishihara, Nagano (JP); Katsushige Yanagisawa, Nagano (JP); Toshiyuki Karasawa, Nagano (JP); Yuichi Takei, Nagano (JP); Akihiro Nagata, Nagano (JP); Shinji Minamisawa, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/914,448

(22) Filed: Oct. 28, 2010

(65) Prior Publication Data

US 2011/0097062 A1   Apr. 28, 2011

Related U.S. Application Data

(63) Continuation of application No. PCT/JP2009/001914, filed on Apr. 27, 2009.

(30) Foreign Application Priority Data

Apr. 30, 2008 (JP) ................................ 2008-118578
Jun. 4, 2008 (JP) ................................ 2008-147187
Dec. 26, 2008 (JP) ................................ 2008-334724

(51) Int. Cl.
*G03B 17/00* (2006.01)
*H04N 5/228* (2006.01)
*H04N 3/16* (2006.01)

(52) U.S. Cl. ................ 396/55; 348/208.99; 348/208.11
(58) Field of Classification Search .................... 396/55; 348/208.99, 208.11
See application file for complete search history.

(56) References Cited

U.S. PATENT DOCUMENTS

| 5,266,988 A * | 11/1993 | Washisu ........................... 396/55 |
| 2006/0034599 A1 * | 2/2006 | Osaka ............................ 396/144 |
| 2007/0236577 A1 * | 10/2007 | Ke et al. .................... 348/208.99 |
| 2010/0080545 A1 * | 4/2010 | Fan et al. ......................... 396/55 |
| 2010/0178044 A1 * | 7/2010 | Ohno .............................. 396/55 |

FOREIGN PATENT DOCUMENTS

| JP | 7-168235 A | 7/1995 |
| JP | 10-96968 A | 4/1998 |
| JP | 11-160748 A | 6/1999 |
| JP | 2001-194150 A | 7/2001 |
| JP | 2007-272210 A | 10/2007 |
| JP | 2007-310084 A | 11/2007 |
| JP | 2009-25481 A | 2/2009 |

OTHER PUBLICATIONS

International Search Report for International Application No. PCT/JP2009/001914 with English translation mailed on May 26, 2009.

* cited by examiner

*Primary Examiner* — Rodney Fuller
(74) *Attorney, Agent, or Firm* — Cantor Colburn LLP

(57) ABSTRACT

An optical imaging device, wherein an imaging unit is displaced to correct the vibrations, and the imaging unit is supported on a stationary object by a total of four suspension wires. A first imaging unit drive mechanism and a second imaging unit drive mechanism are provided as a pair at two positions on either side of the optical axis L. In the imaging unit drive mechanisms, imaging unit drive magnets, are held on the imaging unit side, which is the movable side, and imaging unit drive coils, are held on the stationary object side.

18 Claims, 17 Drawing Sheets

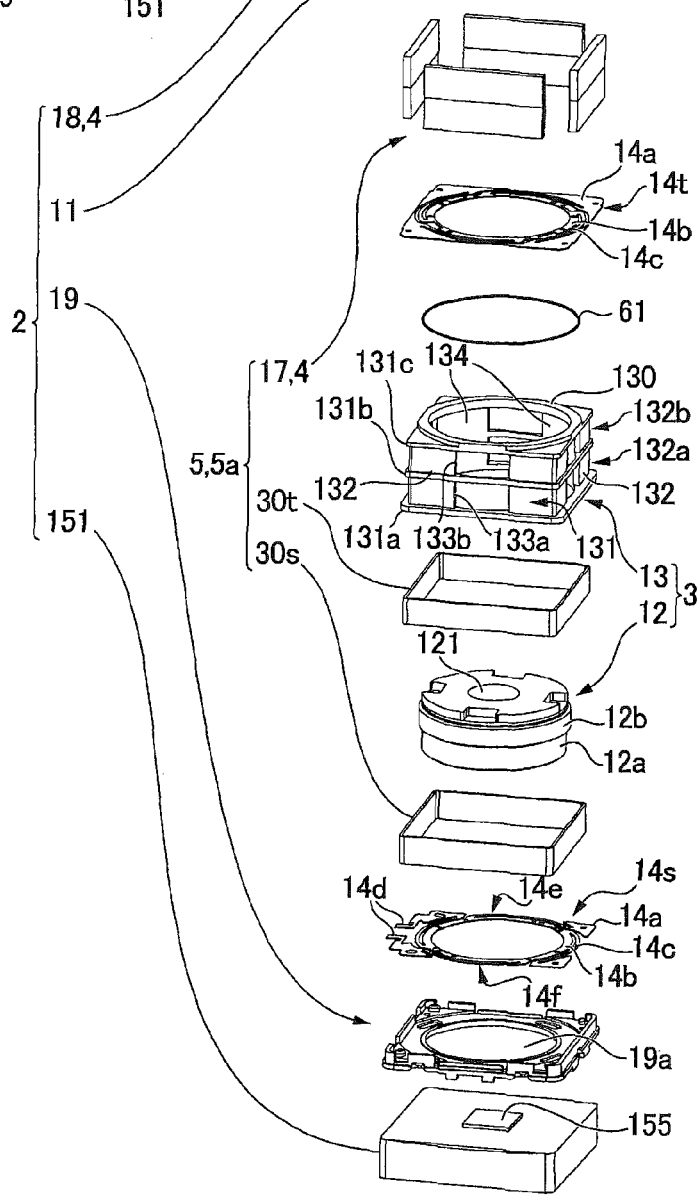

Fig. 6(a)
Fig. 6(b)
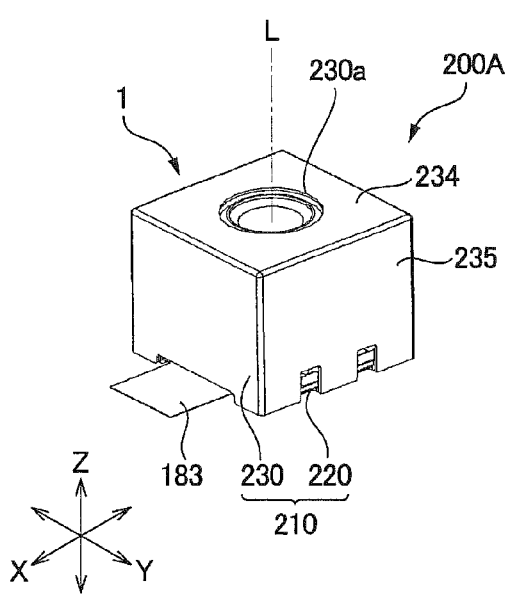
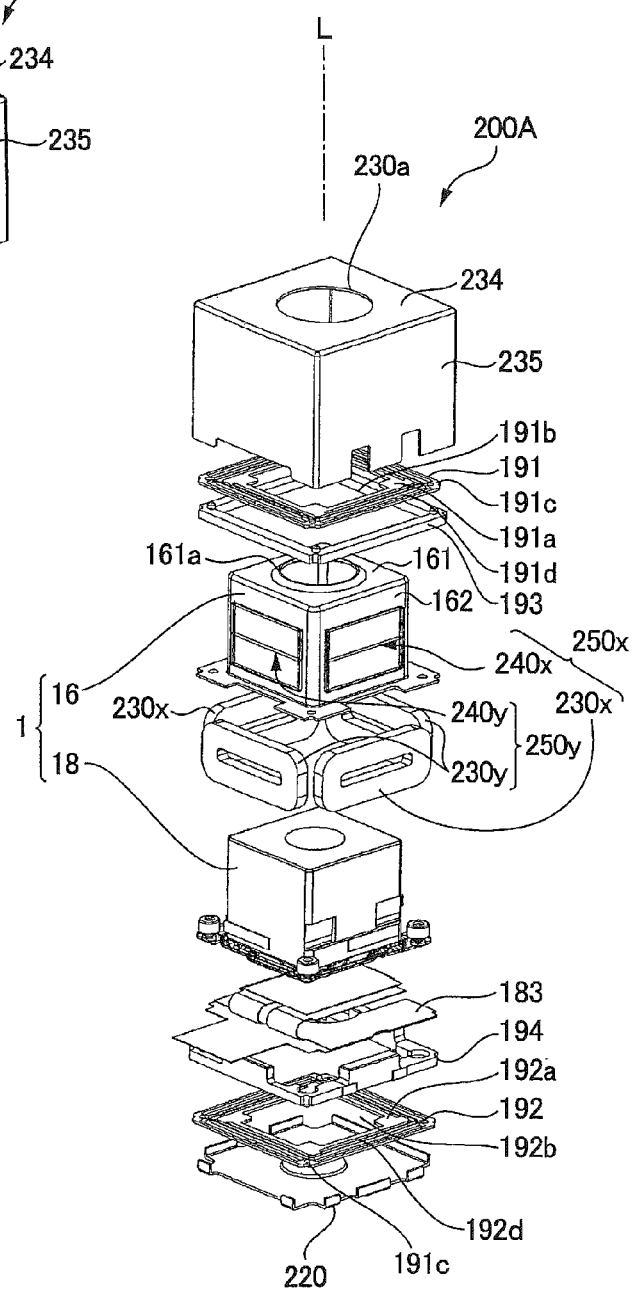

OPTICAL UNIT WITH SHAKE CORRECTING FUNCTION

CROSS REFERENCE TO RELATED APPLICATIONS

This is a Continuation Application of International Application No. PCT/JP2009/001914, filed on 27 Apr. 2009, the disclosure of which is incorporated herein by reference in its entirety. International Application No. PCT/JP2009/001912 claims priority to Japanese Patent Applications No. 2008-118578, filed Apr. 30, 2008; 2008-147187, filed Jun. 4, 2006; and 2008-334724, filed Dec. 26, 2006; priority to each of which is claimed herein and the contents of each of which are incorporated herein by reference.

TECHNICAL FIELD

The present invention relates to an optical unit with shake correcting function which is mounted on a cell phone with camera or the like.

BACKGROUND

A photographic optical device which is mounted on a portable apparatus is provided with a movable body including a lens, a lens drive mechanism for magnetically driving the movable body in an optical axis direction, and a photographing unit in which an imaging element is supported on a support body. In the photographic optical device, various types of a hand shake correction mechanism are mounted for restraining disturbances of a photographed image due to a hand shake of a user. As such a shake correction mechanism, a structure where a shake correction lens provided in a photographing unit is shifted in a direction canceling the shake, a structure where an imaging element is shifted in a plane perpendicular to an optical axis, and the like have been practically used.

A structure where a shake correction mechanism is incorporated into a photographing unit is capable of being adopted in a photographic optical device which is mounted on a relatively large portable apparatus such as a digital camera. However, in a photographic optical device which is mounted on a small portable apparatus such as a cell phone with camera, since a photographing unit is smaller, the shake correction mechanism is unable to be incorporated into the photographing unit.

In order to prevent this problem, in a photographic optical device, it has been proposed that a shake correction mechanism is structured between a photographing unit and a fixed body which supports the photographing unit. In a case that this structure is adopted, the photographing unit is structured as a movable module which is capable of displacing in a direction intersecting the optical axis on the fixed body (see Patent Literature 1).

The shake correction mechanism described in Patent Literature 1 is structured so that a photographing unit is elastically urged by a flat spring against a pivot part formed on a fixed body and the photographing unit is capable of displacing with the pivot part as a supporting point. The photographing unit is rocked around an "X"-axis perpendicular to an optical axis by a first photographing unit drive mechanism which is arranged at one side portion displaced from the pivot part, and the photographing unit is rocked around a "Y"-axis perpendicular to the optical axis by a second photographing unit drive mechanism arranged at another one side portion displaced from the pivot part.

[PTL 1] Japanese Patent Laid-Open No. 2007-310084

However, like the shake correction mechanism described in Patent Literature 1, in a first photographing unit drive mechanism or in a second photographing unit drive mechanism which is arranged at one side portion with respect to the pivot part, even when a positional relationship between the drive mechanism and the pivot part is slightly displaced, a driving power is varied and thus it is difficult to obtain a stable thrust force.

Further, like the shake correction mechanism described in Patent Literature 1, in a structure that a photographing unit drive magnet is provided on a fixed body side and a photographing unit drive coil is provided on a photographing unit side which is a movable body side, since wiring lines for power supply are required to connect with the photographing unit drive coil, the number of wiring lines to the photographing unit is increased and thus a wiring structure is complicated and, on the photographing unit side, it is difficult to increase a winding number of the photographing unit drive coil. Further, since the photographing unit drive coil whose mass is larger than that of the photographing unit drive magnet is provided on the photographing unit side which is the movable body side, a large force is required to rock the photographing unit and its control is difficult In addition, when a magnetic drive mechanism using a photographing unit drive magnet and a photographing unit drive coil is adopted like the shake correction mechanism described in Patent Literature 1, a magnetic device such as a speaker may be affected due to a magnetic noise emitted from the magnetic drive mechanism to the outside. Further, when a magnetic effect is applied from the outside, shake correction is not performed accurately.

In view of the problems described above, at least an embodiment of the present invention provides an optical unit with shake correcting function in which a structure of the photographing unit drive mechanism for shake correction for a movable module provided with a lens such as a photographing unit is improved to be capable of surely correcting a shake such as a hand shake.

Further, at least an embodiment of the present invention provides an optical unit with shake correcting function in which an arrangement of a magnet and a coil which structure the photographing unit drive mechanism for shake correction to the movable module is improved to be capable of rapidly correcting a shake with less power consumption.

Further, at least an embodiment of the present invention provides an optical unit with shake correcting function in which, even when a magnetic drive mechanism is adopted, a magnetic effect to the outside and a magnetic effect from the outside can be prevented.

SUMMARY

In order to solve the above problems, at least an embodiment of the present invention provides an optical unit with shake correcting function including a movable module in which at least a lens is supported on a support body and a fixed body which supports the movable module. The movable module is supported on the fixed body so as to be capable of displacing at least in a direction intersecting the optical axis of the lens, and a movable module drive mechanism for shake correction is provided between the movable module and the fixed body and the movable module drive mechanism generates magnetic drive forces in a pair at two positions interposing the optical axis for displacing the movable module in the direction intersecting the optical axis on the fixed body.

In at least an embodiment of the present invention, the movable module is supported on the fixed body so as to be capable of being displaced and a movable module drive mechanism for displacing the movable module is provided between the movable module and the fixed body. Therefore, in a case that photographing is performed with a cellular phone with camera or the like on which the optical unit with shake correcting function is mounted, even when a shake such as a hand shake is occurred, the shake is corrected by displacement of the movable module. Accordingly, since the shake correction mechanism is not required to be built into the movable module, even when the shake correction mechanism cannot be provided in the movable module due to a small size of the movable module, a shake is corrected. Further, in at least an embodiment of the present invention, since the movable module drive mechanisms disposed at two positions interposing the optical axis generate magnetic forces for displacing the movable module, different from a case that the movable module drive mechanism is disposed only one side with respect to the optical axis, the driving power is stable. In other words, when a distance from the optical axis of one of the movable module drive mechanisms is displaced in a direction so that the drive force becomes smaller, a distance from the optical axis of the other of the movable module drive mechanisms is displaced in a direction so that the drive force becomes larger. Therefore, according to at least an embodiment of the present invention, a shake can be corrected with a high degree of accuracy. In this case, it is preferable that the movable module drive mechanism rocks the movable module on the basis of a detection result of a shake detection sensor which detects inclination of the movable module. It is preferable that the shake detection sensor is mounted at a position opposite to an object to be photographed side with respect to an imaging element in the movable module and the shake detection sensor is a sensor which detects angular velocities of two axes that are perpendicular to each other.

In at least an embodiment of the present invention, a structure may be adopted that the movable module drive mechanism is provided with a movable module drive magnet, which is held by one of the movable module and the fixed body, and a movable module drive coil which is held by the other of the movable module and the fixed body.

In at least an embodiment of the present invention, it is preferable that, when three directions perpendicular to each other are set to be an X-axis, a Y-axis and a Z-axis, and a direction along the optical axis is set to be the Z-axis, the movable module drive mechanism includes a first movable module drive mechanism and a second movable module drive mechanism which are structured between the movable module and the fixed body. The first movable module drive mechanism generates magnetic forces in a pair at two positions interposing the optical axis in an X-axis direction for displacing the movable module in one of the X-axis direction and a Y-axis direction, and the second movable module drive mechanism generates magnetic forces in a pair at two positions interposing the optical axis in the Y-axis direction for displacing the movable module in the other of the X-axis direction and the Y-axis direction. According to this structure, since the movable module are displaced in the X-axis and the Y-axis, when these motions are combined, the movable module is displaced over the entire "XY" plane. Accordingly, all shakes which may be occurred in a cellular phone with camera or the like can be corrected surely.

In at least an embodiment of the present invention, a structure may be adopted that the movable module is supported by the fixed body through a spring member which is connected with the movable module and the fixed body. According to this structure, the movable module is displaceably supported on the fixed body with a simple structure.

In this case, the spring member may be a plurality of suspension wires which are extended along an optical axis direction from the fixed body. According to this structure, the position of the movable module can be controlled with a high degree of accuracy and thus the lens position is not required to monitor by a sensor.

In at least an embodiment of the present invention, it is preferable that the movable module is supported by the fixed body at three or more positions around the optical axis through the suspension wires extending in the optical axis direction. According to this structure, when the movable module is displaced, an attitude of the movable module is not varied and the lens optical axis is not inclined.

In at least an embodiment of the present invention, a structure may be adopted that the spring member includes a first spring member and a second spring member which are disposed on both sides interposing the movable module drive mechanism in the optical axis direction, and the movable module is capable of rocking around an axial line intersecting the optical axis by a magnetic drive force generated by the movable module drive mechanism. According to this structure, a center of a thrust force for displacing an attitude of the movable module by the movable module drive mechanism and a center of restoring torques with which the first spring member and the second spring member having deformed by displacement of the attitude of the movable module are going to return to their original shapes, are disposed between the first spring member and the second spring member. Further, the center of thrust force for displacing an attitude of the movable module by the movable module drive mechanism and the center of restoring torques with which the first spring member and the second spring member having deformed by displacement of the attitude of the movable module are going to return to their original shapes can be also coincided with each other. As a result, when the movable module is to be rocked, forces acting on the first spring member and the second spring member are smaller and thus the movable module drive mechanism is capable of rocking the movable module with a small torque. Further, spring forces of the first spring member and the second spring member which rockably support the movable module may be smaller. Therefore, the movable module can be displaced efficiently.

In at least an embodiment of the present invention, it is preferable that a gravity center of the movable module is located between the first spring member and the second spring member in the optical axis direction. According to this structure, when an attitude of the optical unit with shake correcting function is varied, inclination of the movable module with respect to the optical unit with shake correcting function can be reduced or prevented. As a result, a range that the movable module is inclined due to an attitude of the optical unit with shake correcting function is not required to secure as a moving range of the movable module and thus the size of the optical unit with shake correcting function is reduced. Further, a magnetic drive force generated by the movable module drive mechanism is not required to be varied due to an attitude of the optical unit with shake correcting function and thus the movable module is displaced efficiently. Further, since a moving range of the movable module is smaller, for example, when a restriction member for restricting the moving range of the movable module is disposed, a gap space between the movable module and the restriction member can be made narrower. As a result, in a case that the movable module is collided with the restriction member when an impact is applied to the optical unit with shake correcting function, the occurred impact becomes smaller and thus deformation of the movable module can be prevented. Therefore, the optical unit with shake correcting function can be structured as an impact-resistant device. In addition, a structure for supporting the movable module is not required on an outer side in the Z-axis direction of the movable module and thus the optical unit with shake correcting function can be structured thinner in the Z-axis direction.

In at least an embodiment of the present invention, a structure may be adopted that the movable module drive mechanism for shake correction for generating the magnetic drive forces in a pair at two positions interposing the optical axis are disposed at the two positions separated from each other in the optical axis direction, the spring member is disposed between the movable module drive mechanisms disposed at the two positions separated from each other in the optical axis direction, and the movable module is rocked around an axial line intersecting the optical axis by the magnetic drive forces generated by the movable module drive mechanisms. According to this structure, a center of thrust forces for displacing an attitude of the movable module by the movable module drive mechanisms and a center of a restoring torque with which the spring member having deformed by displacement of the attitude of the movable module is going to return to its original shape are disposed between the two positions. Further, the center of thrust forces for displacing an attitude of the movable module by the movable module drive mechanisms and the center of a restoring torque with which the spring member having deformed by displacement of the attitude of the movable module is going to return to its original shape can be also coincided with each other. Therefore, a rocking center of the movable module can be disposed at a near position to the spring member. As a result, when the movable module is rocked, a force acting on the spring member is smaller and thus the movable module drive mechanism is capable of rocking the movable module with a small torque. Further, a spring force of the spring member which rockably supports the movable module may be smaller. Therefore, the movable module can be displaced efficiently.

In at least an embodiment of the present invention, it is preferable that a gravity center of the movable module is located between the two positions separated from each other in the optical axis direction. According to this structure, since the gravity center of the movable module is located at a near position to the spring member, when an attitude of the optical unit with shake correcting function is varied, inclination of the movable module with respect to the optical unit with shake correcting function can be reduced or prevented. As a result, a range that the movable module is inclined due to an attitude of the optical unit with shake correcting function is not required to secure as a moving range of the movable module and thus the size of the optical unit with shake correcting function is reduced. Further, a magnetic drive force generated by the movable module drive mechanism is not required to be varied due to an attitude of the optical unit with shake correcting function and thus the movable module is displaced efficiently. Further, since a moving range of the movable module is smaller, for example, when a restriction member for restricting the moving range of the movable module is disposed, a gap space between the movable module and the restriction member can be made narrower. As a result, even in a case that the movable module is collided with the restriction member when an impact is applied to the optical unit with shake correcting function, the occurred impact becomes smaller and thus deformation of the movable module can be prevented. Therefore, the optical unit with shake correcting function can be structured as an impact-resistant device. In addition, a structure for supporting the movable module is not required on an outer side in the Z-axis direction of the movable module and thus the optical unit with shake correcting function can be structured thinner in the Z-axis direction.

In at least an embodiment of the present invention, it is preferable that the spring member is a gimbal spring which is provided with an inner peripheral side connecting part connected with the movable module, an outer peripheral side connecting part connected with the fixed body, and a plurality of arm parts extended from the inner peripheral side connecting part and connected with the outer peripheral side connecting part. A gimbal spring is a collective term of a spring member which is provided with an inner peripheral side connecting part connected with the movable module, an outer peripheral side connecting part connected with the fixed body, and a plurality of arm parts extended from the inner peripheral side connecting part and connected with the outer peripheral side connecting part. The gimbal spring applies a substantially uniform urging force in all directions and thus an attitude of the movable module is stable and a control for the shake correction magnetic drive mechanism is extremely easy. According to this structure, even when a strong impact is applied to the optical unit with shake correcting function and the movable module is moved in a wider range, the arm parts follow the displacement of the movable module to be deformed and thus the spring member is not damaged.

In at least an embodiment of the present invention, it is preferable that the movable module drive mechanism for generating the magnetic drive forces in a pair at two positions interposing the optical axis are provided with the movable module drive coils, and a first mode in which a drive force for displacing the movable module in the optical axis direction is generated and a second mode in which a drive force for displacing the movable module in a direction intersecting the optical axis is generated are performed by changing a current-supply direction to the movable module drive coils. According to this structure, an attitude of the movable module can be fixed in a displaced state in the optical axis direction in the first mode, and the movable module can be rocked in the second mode by means of that a current-supply to the movable module drive coils is controlled. In other words, the movable module can be rocked in a floated state by simultaneously using the first mode and the second mode.

In this case, it is preferable that the movable module drive coils which are provided in the movable module drive mechanism in a pair at two positions interposing the optical axis are capable of being respectively supplied with an electric current in independent directions of each other, in the first mode, current-supply directions of the movable module drive coils are selected so that an electromagnetic force generated between the movable module drive coil and the movable module drive magnet disposed on one side with respect to the optical axis and an electromagnetic force generated between the movable module drive coil and the movable module drive magnet disposed on the other side with respect to the optical axis are generated in the same direction as each other in the optical axis direction, and in the second mode, current-supply directions of the movable module drive coils are selected so that an electromagnetic force generated between the movable module drive coil and the movable module drive magnet disposed on the one side with respect to the optical axis and an electromagnetic force generated between the movable module drive coil and the movable module drive magnet disposed on the other side with respect to the optical axis are generated in the opposite direction to each other in the optical axis direction.

Further, in this case, it is preferable that the movable module drive coils which are provided in the movable module drive mechanism in a pair at two positions interposing the optical axis are serially connected with each other, a connecting wire between the movable module drive coil on the one side with respect to the optical axis and the movable module drive coil on the other side with respect to the optical axis is provided with an intermediate terminal, a portion through the movable module drive coil on the one side to the intermediate terminal and a portion through the movable module drive coil on the other side to the intermediate terminal are capable of being supplied with an electric current in independent directions of each other. According to this structure, current-supply directions to the respective movable module drive coils can be changed easily.

In addition, it is preferable that the portion through the movable module drive coil on the one side to the intermediate terminal and the portion through the movable module drive coil on the other side to the intermediate terminal are capable of being supplied with electric currents having different values from each other. When the first mode and the second mode are used simultaneously, an electric current for the first mode and an electric current for the second mode are supplied at the same time and thus different electric currents are supplied to the respective movable module drive coils.

In at least an embodiment of the present invention, it is preferable that an urging means is provided which presses the movable module against the fixed body in the optical axis direction, when the movable module is to be displaced in the direction intersecting the optical axis, the movable module drive mechanism generates a drive force for separating the movable module from the fixed body against an urging force of the urging means. According to this structure, when the movable module drive mechanism does not generate a magnetic drive force, the movable module is fixed to the fixed body and does not move. Therefore, when the optical unit with shake correcting function is being carried or the like, the movable module and the fixed body are prevented from being collided with each other by vibration applied to the optical unit with shake correcting function to occur an abnormal noise such as rattling or the like. On the other hand, a timing between the first mode which generates a drive force for displacing the movable module in the optical axis direction and the second mode which generates a drive force for displacing the movable module in a direction intersecting the optical axis is adjusted, the movable module can be immediately rocked from a state fixed to the fixed body while the movable module is displaced in the optical axis direction.

In at least an embodiment of the present invention, a structure may be adopted that the urging means is provided with at least one of a mechanical spring which utilizes the above-mentioned spring member or another spring and a magnetic spring which utilizes the movable module drive magnet or another magnet.

In at least an embodiment of the present invention, a structure may be adopted that the movable module is an image-pickup unit in which an imaging element is held by the support body.

In this case, a structure may be adopted that the lens is included in a movable body which is movably supported on the support body in the optical axis direction, a lens drive mechanism for driving the movable body in the optical axis direction is supported on the support body in the image-pickup unit. According to this structure, even when the movable module is provided with the lens drive mechanism, a shake of a cell phone which is mounted with an optical unit with shake correcting function or the like is corrected by displacement of the movable module and thus the shake correction mechanism is not required to be built into the movable module. Accordingly, since the shake correction mechanism is not required to be built into the movable module, even when the shake correction mechanism cannot be provided in the movable module due to a small size of the movable module, a shake is corrected.

Further, in this case, the lens drive mechanism is capable of magnetically driving the movable body in the optical axis direction.

In at least an embodiment of the present invention, it is preferable that the movable module drive magnet is held by the movable module and the movable module drive coil is held by the fixed body. According to this structure, the number of wiring lines to the movable module is small and thus a structure for the wiring lines can be simplified. Further, the winding number of the movable module drive coil can be increased and thus a large drive force can be obtained. In addition, since the movable module drive magnet whose mass is smaller than that of the movable module drive coil is provided on the movable module which is the movable body, the weight of the movable module can be reduced. Accordingly, since the movable module can be displaced with a small force, power consumption required for shake correction can be reduced. Further, responsiveness to a shake is superior.

In at least an embodiment of the present invention, it is preferable that the movable module is an image-pickup unit in which an imaging element is held by the support body, the lens is included in a movable body which is movably supported on the support body in the optical axis direction, the lens drive mechanism which magnetically drives the movable body in the optical axis direction is supported on the support body in the movable module, the movable module drive magnets of the movable module drive mechanism in a pair at two positions interposing the optical axis are held by the movable module and the movable module drive coils are held by the fixed body, the movable module is provided with a cover part surrounding the movable body on an outer peripheral side, the lens drive mechanism is provided with a lens drive coil which is held by an outer peripheral face of the movable body and a lens drive magnet which is held by an inner peripheral face of the cover part, and the movable module drive magnets are held by an outer peripheral face of the cover part. According to this structure, even when the movable module is provided with the lens drive mechanism, a shake of a cell phone which is mounted with an optical unit with shake correcting function or the like is corrected by displacement of the movable module and thus the shake correction mechanism is not required to be built into the movable module. Accordingly, even when the shake correction mechanism cannot be provided in the movable module due to a small size of the movable module, a shake is corrected. Further, the lens drive magnet and the movable module drive magnet are disposed on both sides of the cover part and thus a magnetic interference between the lens drive mechanism and the movable module drive mechanism can be prevented.

In at least an embodiment of the present invention, it is preferable that the movable module drive coil is wound around a tube-like shape which is opened toward the movable module, and a part of the movable module drive magnet is located in an inner side of the movable module drive coil. According to this structure, a magnetic field interlinking with the movable module drive coil is efficiently generated by the movable module drive magnet and thus a thrust force to the movable module can be improved.

In at least an embodiment of the present invention, it is preferable that the fixed body is provided with a fixed body side yoke on an outer side with respect to the movable module drive coil, and the fixed body side yoke is provided with an opening part at a facing portion to the movable module drive magnet. According to this structure, a magnetic field interlinking with the movable module drive coil is efficiently generated by the movable module drive magnet and thus a thrust force to the movable module can be improved.

In at least an embodiment of the present invention, it is preferable that the fixed body is attached with a buffer member which interferes with the movable module when the movable module is displaced in the direction intersecting the optical axis. According to this structure, when an impact is applied to the optical unit with shake correcting function to cause the movable module to displace in a direction intersecting the optical axis, the impact of hitting of the movable module against the fixed body is absorbed.

In at least an embodiment of the present invention, it is preferable that the movable module is provided with a movable module side yoke which covers the movable module drive magnet and the movable module drive coil on both sides in the optical axis direction. According to this structure, since leakage flux can be reduced, a thrust force to the movable module is improved.

In at least an embodiment of the present invention, it is preferable that a fixed cover is provided in the fixed body for covering the movable module and the movable module drive mechanism on an outer peripheral side and, when the fixed cover is viewed in a direction perpendicular to the optical axis, a portion of the fixed cover disposed on an outer side of the movable module drive magnet which is located at least within a magnetic flux region of the movable module drive magnet is formed of a magnetic body. According to this structure, leakage flux from the movable module drive mechanism to the outer side of the fixed cover can be reduced. Further, since the magnetic material acts as a flux concentrating yoke, interlinkage flux interlinking with the movable module drive coil is increased. Therefore, when an attitude of the movable module is to be displaced by the movable module drive mechanism, a large thrust force can be obtained and thus, responsiveness to a shake is superior.

In at least an embodiment of the present invention, it is preferable that the fixed cover is provided with a first cover portion formed of nonmagnetic material and a second cover portion formed of a magnetic body. Also in this structure, leakage flux from the movable module drive mechanism to the outer side of the fixed cover can be reduced. Further, since the magnetic material acts as a flux concentrating yoke, interlinkage flux interlinking with the movable module drive coil is increased and thus, when an attitude of the movable module is to be displaced by the movable module drive mechanism, a large thrust force can be obtained. Therefore, responsiveness to a shake is superior. In addition, the outside magnetic flux is prevented from entering into the shake correction magnetic drive mechanism and thus an effect given to an attitude of the movable module can be reduced. Moreover, a structure may be easily attained that a magnetic body is not provided at a position where a magnetic attraction force with the movable module drive coil applies a load when the movable module is to be displaced.

In at least an embodiment of the present invention, it is preferable that the fixed body includes a fixed cover whose magnetic body portion covers the movable module and an outer peripheral side of the movable module drive mechanism, and magnetic poles of the movable module drive magnets adjacent to each other around the optical axis are different from each other. According to this structure, since magnetic flux is generated between the movable module drive magnets which are adjacent to each other around the optical axis, a magnetic flux passed through the fixed cover is reduced. As a result, since an attraction force between the fixing cover and the movable module drive magnet is reduced, an effect of the attraction force given to the displacement of the movable module can be reduced.

In at least an embodiment of the present invention, it is preferable that the movable module is provided with a movable module side yoke, which holds the movable module drive magnet, and the movable module side yoke is provided with a coil side flux concentrating yoke portion which is bent and extended to a position facing an outer face of the movable module drive magnet. According to this structure, since the movable module drive mechanism is interposed by a yoke which is provided with a coil side flux concentrating yoke portion, leakage flux from the movable module drive mechanism can be reduced. Further, since interlinkage flux interlinking with the movable module drive coil is increased, when an attitude of the movable module is to be displaced by the movable module drive mechanism, a large thrust force can be obtained. Therefore, responsiveness for a shake is superior.

In at least an embodiment of the present invention, the movable module is displaceably supported on the fixed body and a movable module drive mechanism for displacing the movable module is provided between the movable module and the fixed body. Therefore, in a case that photographing is performed with a cellular phone with camera or the like on which the optical unit with shake correcting function is mounted, even when a shake is occurred, the shake is corrected by displacing of the movable module. Accordingly, since the shake correction mechanism is not required to be built into the movable module, even when the shake correction mechanism cannot be provided in the movable module due to a small size of the movable module, a shake is corrected. Further, in at least an embodiment of the present invention, since the movable module drive mechanisms disposed at two positions interposing the optical axis generate magnetic forces for displacing the movable module, different from a case that the movable module drive mechanism is disposed only one side with respect to the optical axis, the driving power is stable. In other words, when a distance from the optical axis of one of the movable module drive mechanisms is displaced in a direction so that the drive force becomes smaller, a distance from the optical axis of the other of the movable module drive mechanisms is displaced in a direction so that the drive force becomes larger. Therefore, according to at least an embodiment of the present invention, a shake can be corrected with a high degree of accuracy.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

[FIG. 1]

FIG. 2 is a longitudinal sectional view showing the photographic optical device in accordance with the first embodiment of the present invention which is cut in parallel to the optical axis.

[FIG. 3]

FIG. 4 is an explanatory view schematically showing an operation of the photographing unit shown in FIGS. 3(a) and 3(b).

[FIG. 5]

[FIG. 6]

FIG. 6(a) is an outward appearance view showing a photographic optical device in accordance with a second embodiment of the present invention which is viewed from obliquely above on an object to be photographed side, and FIG. 6(b) is its exploded perspective view.

FIG. 7 is a longitudinal sectional view showing the photographic optical device in accordance with the second embodiment which is cut in parallel to the optical axis.

[FIG. 8]

[FIG. 9]

FIG. 9(a) is a view schematically showing a current flow when a thrust force for moving the photographing unit in a Z-axis direction is applied to the photographing unit, and FIG. 9(b) is a view schematically showing a current flow when a moment for rocking the photographing unit is applied to the photographing unit.

[FIG. 10]

FIG. 11 is a longitudinal sectional view showing the photographic optical device in accordance with the third embodiment which is cut in parallel to the optical axis.

[FIG. 12]

[FIG. 13]

FIG. 13(a) is a view schematically showing a current flow when a thrust force for moving the photographing unit in a Z-axis direction is applied to the photographing unit and FIG. 13(b) is a view schematically showing a current flow when a moment for rocking the photographing unit is applied to the photographing unit.

[FIG. 14]

FIG. 15 is a longitudinal sectional view showing a photographic optical device in which a fixed cover and a base are formed of magnetic material.

FIG. 16 is a perspective view showing the photographic optical device in FIG. 15 in which a fixed cover, parts of photographing unit drive coils, a first spring, a frame body and the like are detached and which is viewed from obliquely above on an object to be photographed side.

FIG. 17 is a perspective view showing a photographic optical device in which a part of a fixed cover is formed of magnetic material and its remaining portion is formed of nonmagnetic material.

FIG. 18 is a longitudinal sectional view schematically showing an example in which a shape of a yoke in a photographing unit is modified.

DESCRIPTION OF EMBODIMENTS

Embodiments of the present invention will be described below with reference to the accompanying drawings. In the following description, a structure for preventing a shake by hand (hand shake) of a photographing unit as a movable module will be described as an example. Therefore, in the following description, a photographic optical device corresponds to an optical unit with shake correcting function. Further, in the following description, three directions perpendicular to each other are respectively set to be an X-axis, a Y-axis and a Z-axis and a direction along an optical axis "L" (lens optical axis) is set to be the Z-axis. Therefore, in the following description, a rocking around the X-axis of shakes in the respective directions corresponds to a so-called pitching (longitudinal swing), a rocking around the Y-axis corresponds to a so-called yawing (lateral swing), and a rocking around the Z-axis corresponds to a so-called rolling.

First Embodiment (Entire Structure of Photographic Optical Device)

Figures 1A, 1B:
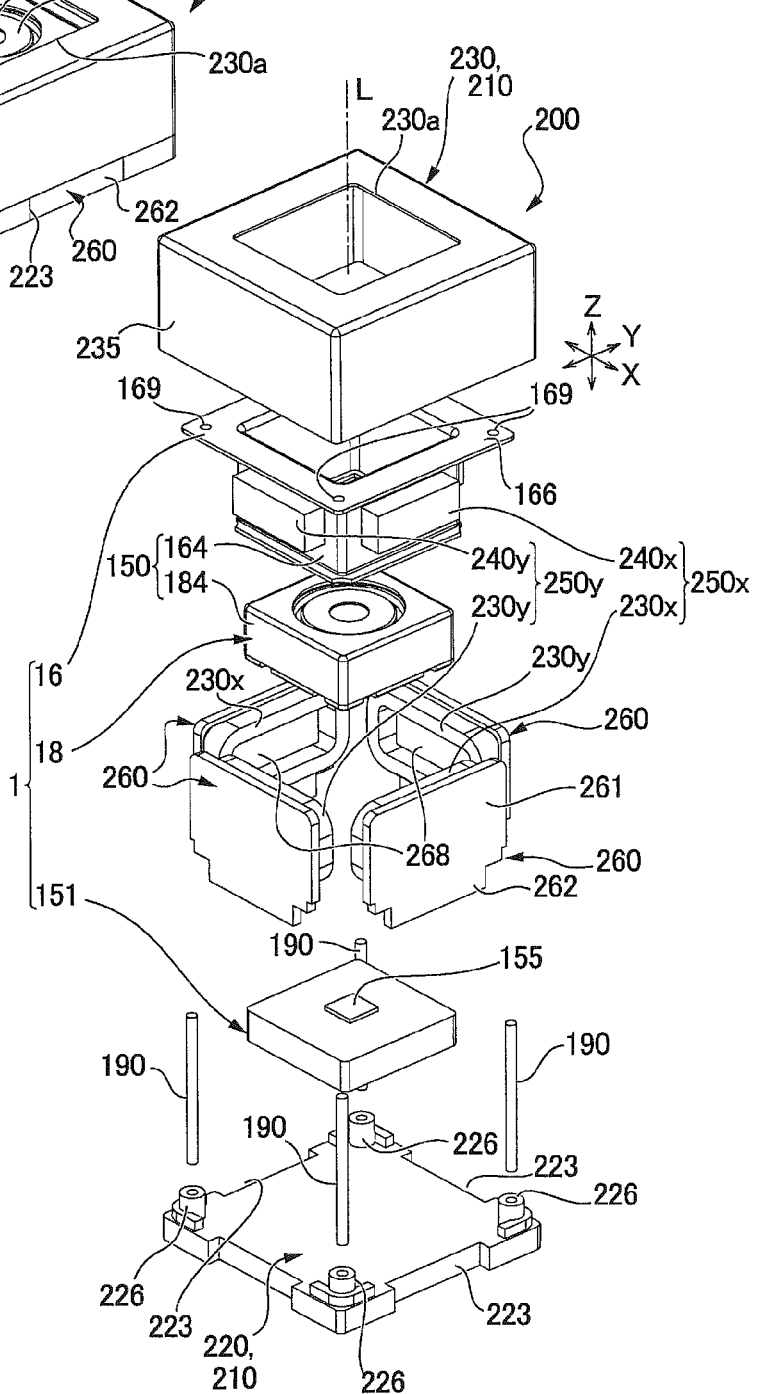
FIG. 1(a) is an outward appearance view showing a photographic optical device in accordance with a first embodiment of the present invention which is viewed from obliquely above on an object to be photographed side.
FIG. 1(b) is its exploded perspective view.
Figure 2:
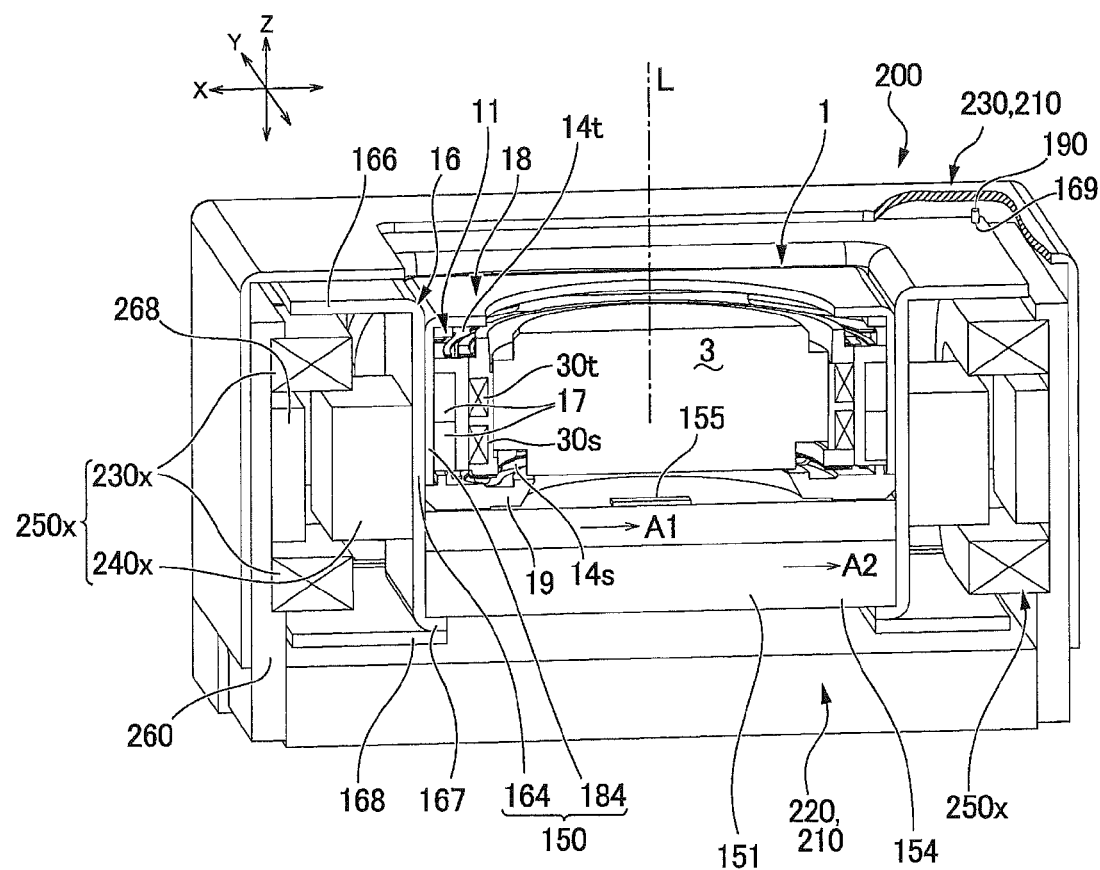
[FIG. 2]

FIG. 1(a) is an outward appearance view showing a photographic optical device in accordance with a first embodiment of the present invention which is viewed from obliquely above on an object to be photographed side, and FIG. 1(b) is its exploded perspective view. FIG. 2 is a longitudinal sectional view showing the photographic optical device in accordance with the first embodiment of the present invention which is cut in parallel to the optical axis.

A photographic optical device 200 (optical unit with shake correcting function) shown in FIGS. 1(a) and 1(b) and FIG. 2 is a thin type camera which is used in a cell phone with camera and is provided with a substantially rectangular parallelepiped shape as a whole. In this embodiment, the photographic optical device 200 includes a base 220 in a rectangular plate shape and a box-shaped fixed cover 230 which is fitted so as to cover an upper side of the base 220. The base 220 and the fixed cover 230 structure a fixed body 210. A rectangular window 230a for light transmission is formed in an upper plate portion of the fixed cover 230.

As described below, in this embodiment, an inner side of the fixed cover 230 is structured with a photographing unit 1 (movable module) and a shake correction mechanism for displacing the photographing unit 1 to correct a shake.

(Structure of Photographing Unit)

Figure 3A:
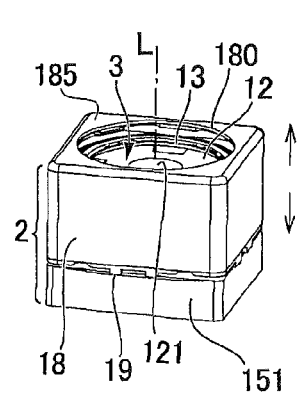
FIG. 3(a) is an outward appearance view showing a photographing unit used in the photographic optical device in accordance with the first embodiment of the present invention which is viewed from obliquely above.
Figure 3B:
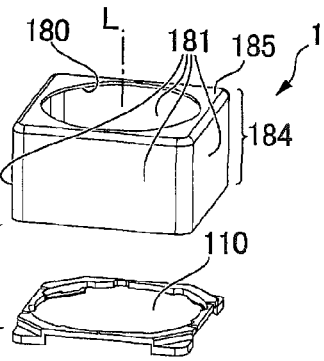
FIG. 3(b) is its exploded perspective view.
Figure 4:
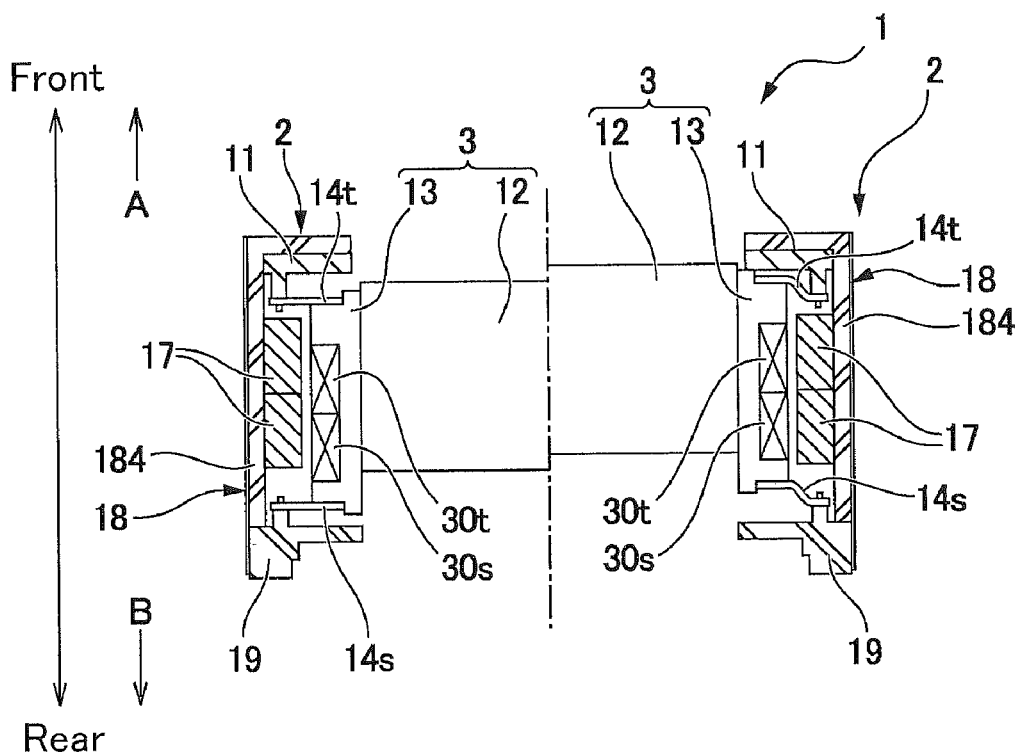
[FIG. 4]

FIG. 3(a) is an outward appearance view showing the photographing unit 1 used in the photographic optical device 200 to which at least an embodiment of the present invention is applied and which is viewed from obliquely above, and FIG. 3(b) is its exploded perspective view. FIG. 4 is an explanatory view schematically showing an operation of the photographing unit 1 shown in FIGS. 3(a) and 3(b). A left half of FIG. 4 is a view where a movable body 3 is located at an infinity position (normal photographing position) and a right half of FIG. 4 is a view where the movable body 3 is located at a macro-position (close-up photographing position).

As shown in FIGS. 3(a) and 3(b) and FIG. 4, the photographing unit 1 moves, for example, three pieces of lenses 121 along an optical axis "L" in both of an "A"-direction (front side) approaching to an object to be photographed (object side) and a "B"-direction (rear side) approaching to an opposite side to the object to be photographed (imaging element side/image side). The photographing unit 1 is formed in a substantially rectangular parallelepiped shape. The photographing unit 1 generally includes the movable body 3 which holds three pieces of lenses 121 and a fixed diaphragm on its inner side, a lens drive mechanism 5 for moving the movable body 3 along an optical axis direction, and a support body 2 on which the lens drive mechanism 5, the movable body 3 and the like are mounted. The movable body 3 is provided with a lens holder 12 in a cylindrical shape which holds the lenses 121 and the fixed diaphragm, and a coil holder 13 which holds lens drive coils 30s and 30t described below on its outer peripheral side face.

The support body 2 is provided with an imaging element holder 19 in a rectangular plate shape in which an imaging element 155 is positioned on an opposite side to the object to be photographed side, a case 18 in a box shape which is attached to the imaging element holder 19 on the object to be photographed side, and a spacer 11 in a rectangular plate shape which is disposed on an inner side of the case 18. Center portions of the case 18 and the spacer 11 are respectively formed with circular incident windows 110 and 180 for taking light into the lenses 121 from an object to be photographed. Further, a center portion of the imaging element holder 19 is formed with a hole 190 for guiding the incident light to the imaging element 155.

In addition, the support body 2 in the photographing unit 1 is provided with a plate 151 on which the imaging element 155 is mounted and the plate 151 is fixed on an under face of the imaging element holder 19.

In this embodiment, the case 18 is made of a ferromagnetic plate such as a steel plate and functions also as a yoke. Therefore, the case 18 structures an interlinkage magnetic field generating body 4 together with lens drive magnets 17 described below for generating interlinkage magnetic field in lens drive coils 30s and 30t which are held by a coil holder 13. The interlinkage magnetic field generating body 4 structures a lens drive mechanism 5 together with the lens drive coils 30s and 30t which are wound around an outer peripheral face of the coil holder 13.

The support body 2 and the movable body 3 are connected with each other through metal spring members 14s and 14t. Basic structures of the spring members 14s and 14t are similar to each other. Each of the spring members 14s and 14t is provided with an outer peripheral side connecting part 14a which is held by the support body 2, a ring-shaped inner peripheral side connecting part 14b which is held by the movable body 3, and an arm-shaped flat spring part 14c which connects the outer peripheral side connecting part 14a with the inner peripheral side connecting part 14b. The outer peripheral side connecting part 14a of the spring member 14s on the imaging element side is held by the imaging element holder 19 and its inner peripheral side connecting part 14b is connected with an imaging element side end face of the coil holder 13 of the movable body 3. The outer peripheral side connecting part 14a of the spring member 14t on the object to be photographed side is held by the spacer 11, and its inner peripheral side connecting part 14b is connected with an object to be photographed side end face of the coil holder 13 of the movable body 3. In this manner, the movable body 3 is movably supported along the direction of the optical axis "L" by the support body 2 through the spring members 14s and 14t. Each of the spring members 14s and 14t is made of nonmagnetic metal such as beryllium copper or nonmagnetic SUS steel material and is formed by means of that a thin plate having a predetermined thickness is performed by press working or etching processing with the use of photo-lithography technique. The spring member 14s is divided into two spring pieces 14e and 14f and coil ends of the lens drive coils 30s and 30t are respectively connected with the spring pieces 14e and 14f. Further, the spring pieces 14e and 14f of the spring member 14s are respectively formed with terminals 14d and the spring member 14s (spring pieces 14e and 140 functions also as a power supply member to the lens drive coils 30s and 30t.

In this embodiment, a ring-shaped magnetic piece 61 is held on the object to be photographed side end face of the coil holder 13 and the magnetic piece 61 is located at an object to be photographed side position with respect to the lens drive magnets 17. The magnetic piece 61 applies an urging force in the direction of the optical axis "L" to the movable body 3 by an attraction force generated between the lens drive magnets 17 and the magnetic piece 61. Therefore, the movable body 3 is prevented from being displaced by its own weight at the time of no energization and thus the movable body 3 is maintained in a desired posture and its impact resistance is improved. Further, the magnetic piece 61 acts as a kind of yoke to reduce leakage flux from a magnetic path which is structured between the lens drive magnets 17 and the lens drive coils 30s and 30t. In accordance with an embodiment, a bar or ball shaped magnetic body may be used as the magnetic piece 61. In a case that the magnetic piece 61 is formed in a ring shape, when the lens holder 12 is to be moved in the optical axis direction, a magnetic attraction force attracted between the lens drive magnets 17 and the magnetic piece 61 becomes isotropically.

Further, since the magnetic piece 61 is disposed on the object to be photographed side end face of the lens holder 12, at the time of no energization (home position), the lens holder 12 is placed in a stationary state on the imaging element side by means of that the magnetic piece 61 is attracted by the lens drive magnets 17. Further, at the time of energization, the magnetic piece 61 held on the object to be photographed side end face of the lens holder 12 is moved to a further separated position from the lens drive magnets 17 and thus an unnecessary force for pressing the lens holder 12 against the imaging element side does not act. Therefore, the lens holder 12 can be moved in the optical axis direction with less electric power.

In the photographing unit 1 in this embodiment, when viewed in the direction of the optical axis "L", the lens 121 is formed in a circular shape but the case 18 used for the support body 2 is formed in a rectangular box shape. Therefore, the case 18 is provided with a rectangular tube-shaped body part 184 and an upper plate part 185 having an incident window 180 which is formed on an upper face side of the rectangular tube-shaped body part 184. In this embodiment, the rectangular tube-shaped body part 184 is formed in a square tube shape and provided with four side plate parts 181 at respective positions corresponding to sides of a quadrangle when viewed in the direction of the optical axis "L".

Respective inner faces of four side plate parts 181 are fixed with the lens drive magnets 17 and each of the lens drive magnets 17 is formed of a rectangular flat plate-shaped permanent magnet. Each of four lens drive magnets 17 is divided into two pieces in the direction of the optical axis "L" and each of the pieces is magnetized so that its inner face and outer face are magnetized in different poles from each other. In four lens drive magnets 17, for example, an inner face of an upper half portion is magnetized in an "N"-pole and its outer face is magnetized in an "S"-pole, and an inner face of a lower half portion is magnetized in an "S"-pole and its outer face is magnetized in an "N"-pole. Therefore, in four lens drive magnets 17, arrangement of the magnetic poles of adjacent permanent magnets is the same as each other and thus interlinkage flux lines to the coils are generated efficiently.

The movable body 3 includes the lens holder 12 in a cylindrical shape, which holds the lenses 121 and the like, and the coil holder 13 in which the coil (lens drive coils 30s and 30t) is wound around its outer peripheral side face. A side wall portion of the movable body 3 is structured by the lens holder 12 and the coil holder 13. The lens holder 12 is structured so that its upper half portion is formed in a large diameter cylindrical part 12b having a larger diameter and its lower half portion is formed in a small diameter cylindrical part 12a having a smaller diameter than the large diameter cylindrical part 12b. The coil holder 13 is provided with a circular lens holder accommodating opening 130 for holding the lens holder 12 in its inside.

In this embodiment, an inner circumferential shape of the coil holder 13 is circular when viewed in the direction of the optical axis "L" but its outer peripheral side face 131 which defines the outer peripheral shape of the coil holder 13 is rectangular and thus four faces 132 are provided at respective positions corresponding to four sides of the quadrangle. In the outer peripheral side face 131 of the coil holder 13, rib-shaped protruded parts 131a, 131b and 131c are formed at both end parts and a center position in the direction of the optical axis "L" over the whole circumference. A recessed part between the rib-shaped protruded part 131a which is formed at the imaging element side end part and the rib-shaped protruded part 131b formed at the center position is a first coil winding part 132a, and a recessed part between the rib-shaped protruded part 131c which is formed at the object side end part and the rib-shaped protruded part 131b formed at the center position is a second coil winding part 132b.

Each of four faces 132 of the coil holder 13 is formed with a rectangular through hole (through holes 133a and 133b) so that the first coil winding part 132a and the second coil winding part 132b are respectively removed so as to avoid the corner portions of the quadrangle. The through holes 133a and 133b are penetrated through the side face wall of the coil holder 13 in an inner and outer direction. In this manner, in this embodiment, hollow portions which are recessed toward the inner side are structured in the outer peripheral side face 131 of the movable body 3 by forming the through holes 133a and 133b in the coil holder 13. The through holes 133a and 133b are formed at center portions in the circumferential direction between adjacent corner portions in the outer peripheral side face 131 of the coil holder 13. Lengths of the through holes 133a and 133b in the circumferential direction are set to be about ⅓ dimension of lengths of the respective faces 132 (side dimension of the quadrangle). Therefore, the corner portions of the coil holder 13 are formed with support portions 134 having a larger wall thickness which are extended with a similar thickness toward the direction of the optical axis "L". The through holes 133a and 133b are formed over the whole in a widthwise direction (direction of optical axis "L") of the first coil winding part 132a and the second coil winding part 132b but are not formed in the rib-shaped protruded parts 131a, 131b and 131c. Therefore, the through holes 133a and 133b (hollow portion) are formed only at midway portions of the coil holder 13 (movable body 3) in the direction of the optical axis "L" and formed at the positions except both end parts.

In the coil holder 13 which is structured as described above, the lens drive coil 30s is wound around the first coil winding part 132a and the lens drive coil 30t is wound around the second coil winding part 132b. In this embodiment, the first coil winding part 132a and the second coil winding part 132b are formed in a rectangular shape when viewed in the direction of the optical axis "L" and thus each of the lens drive coils 30s and 30t is wound around in a rectangular tube shape. Further, each of four lens drive magnets 17 is divided into two pieces in the direction of the optical axis "L" and each of the pieces is magnetized so that its inner face and outer face are magnetized in different poles from each other. Therefore, winding directions of two lens drive coils 30s and 30t are opposite to each other.

Further, length dimensions in the direction of the optical axis "L" of the through holes 133a and 133b are equal to length dimensions in the direction of the optical axis "L" of the first coil winding part 132a and the second coil winding part 132b, and the through holes 133a and 133b are formed over the whole in the direction of the optical axis "L" of the first coil winding part 132a and the second coil winding part 132b. However, the lens drive coils 30s and 30t are wound around the whole of the first coil winding part 132a and the second coil winding part 132b and passed through the whole of formed regions of the through holes 133a and 133b. Therefore, the opened portions of the through holes 133a and 133b to the outer side are closed by the lens drive coils 30s and 30t. Further, the lens holder 12 is disposed in the lens holder accommodating opening 130 of the coil holder 13. Therefore, the opened portion to the inner side of the through hole 133b which is located on the object to be photographed side in the direction of the optical axis "L" is closed by the large diameter cylindrical tube part 12b which is formed in the upper half part of the lens holder 12. Further, the through hole 133a which is located on the imaging element side in the optical axis direction faces the small diameter cylindrical tube part 12a which is formed in the lower half part of the lens holder 12.

The coil holder 13 which is structured as described above is disposed in the inside of the case 18. As a result, four side parts of the lens drive coils 30s and 30t are respectively faced with the lens drive magnets 17 which are fixed to the inner face of the rectangular tube-shaped body part 184 of the case 18.

As described above, in this embodiment, the coil holder 13 is provided with the through holes 133a and 133b (hollow portion) and thus the weight of the movable body 3 is reduced and a thrust force for the movable body 3 is enhanced. Further, the through holes 133a and 133b are formed in the face 132 except the corner part of the outer peripheral side face 131 of the coil holder 13 and thus thick wall portions extended in the direction of the optical axis "L" are formed as support portions 134 at the corner portions of the coil holder 13. Therefore, even when the weight of the movable body 3 is reduced by forming of the through holes 133a and 133b, the movable body 3 is provided with a sufficient strength. Further, if the through holes 133a and 133b are formed in the corner parts of the coil holder 13, when the lens drive coils 30s and 30t are wound around, shapes of the lens drive coils 30s and 30t are disordered at the corner portions and the lens drive coils 30s and 30t cannot be wound around in a quadrangular shape. However, in this embodiment, since the through holes 133a and 133b are formed in the face 132 except the corner parts, even when the lens drive coils 30s and 30t are wound around so as to pass the through holes 133a and 133b, the lens drive coils 30s and 30t are wound around in a quadrangular shape.

Further, since the through holes 133a and 133b are formed at the center portions of sides of a polygonal shape, the support portions 134 having a larger thickness extended in the direction of the optical axis "L" can be formed so as to have a similar thickness to each other at a plurality of the corner portions of the polygonal shape. Therefore, a weight balance and a strength balance can be preferably secured in the circumferential direction of the movable body. Moreover, the through holes 133a and 133b are formed at midway portions except the both end parts in the direction of the optical axis "L" of the coil holder 13 and thus the strength of the both ends of the coil holder 13 can be prevented from being reduced. Therefore, when the lens drive coils 30s and 30t are to be wound around the coil holder 13, since a sufficient load can be applied to the coil wire, the lens drive coils 30s and 30t are wound around in a tightly aligned state and thus a sufficient thrust force can be obtained.

(Operation of Lens Drive Mechanism)

In the photographing unit 1 in this embodiment, the movable body 3 is normally located on the imaging element side and, in this state, when an electric current is supplied to the lens drive coils 30s and 30t in a predetermined direction, the lens drive coils 30s and 30t are respectively received with an upward (front side) electro-magnetic force. Therefore, the movable body 3 to which the lens drive coils 30s and 30t are fixed begins to move toward the object to be photographed side (front side). At the same time, elastic forces which restrict movement of the movable body 3 are generated between the spring member 14t and the front end of the movable body 3 and between the spring member 14s and the rear end of the movable body 3. Therefore, the movable body 3 is stopped when the electro-magnetic force moving the movable body 3 toward the front side and the elastic forces restricting the movement of the movable body 3 are balanced with each other. In this case, when an amount of the electric current supplied to the lens drive coils 30s and 30t is adjusted according to the elastic forces of the spring members 14s and 14t acting on the movable body 3, the movable body 3 can be stopped at a desired position.

As described above, the spring members 14s and 14t which are utilized in this embodiment are satisfied with a linear relationship between an elastic force (stress) and a displacement amount (distortion amount). Therefore, a linearity between a moving amount of the movable body 3 and a current supplied to the lens drive coils 30s and 30t can be improved. Further, since two spring members 14s and 14t are used, large balanced forces are applied in the direction of the optical axis "L" when the movable body 3 is stopped and thus, even when a centrifugal force or an impact force are acted in the direction of the optical axis "L", the movable body 3 is further stably stopped. In addition, in the photographing unit 1, the movable body 3 is stopped by utilizing a balance between an electro-magnetic force and an elastic force instead of colliding with a collided member (buffer member) and thus occurrence of a collision noise is prevented.

Further, the case 18 is formed in a box-like shape provided with the upper plate part 185 in the upper face of the rectangular tube-shaped body part 184 and thus the leakage flux from the magnetic path structured between the lens drive magnets 17 and the lens drive coils 30s and 30t can be reduced. Therefore, a moving amount of the coil holder 13 and a thrust force based on a current supplied to the lens drive coils 30s and 30t can be improved. Further, in a case that the photographing unit 1 is assembled into a cellular phone, leakage flux to electronic components disposed on its periphery can be reduced.

Further, in the photographing unit 1, the lens 121 is circular but the lens drive coils 30s and 30t are rectangular regardless of the lens shape, and the lens drive magnets 17 are flat plate-shaped permanent magnets which are respectively fixed to a plurality of inner faces corresponding to sides of the rectangular tube-shaped body part 184 of the case 18 in the support body 2 whose inner peripheral faces are formed in a rectangular shape. Therefore, even when there is no sufficient space between the movable body 3 and the support body 2 on the outer peripheral side of the movable body 3, facing area of the lens drive coils 30s and 30t with the lens drive magnets 17 is larger and thus a sufficient thrust force is obtained. Further, when the movable body 3 is viewed in the direction of the optical axis "L", the outer peripheral side face of the movable body 3 (outer peripheral side face 131 of the coil holder 13) is formed in a quadrangular shape that is similar to the lens drive coils 30s and 30t. Therefore, only when the lens drive coils 30s and 30t are wound around the outer peripheral face of the movable body 3 (outer peripheral side face 131 of the coil holder 13), the lens drive coils 30s and 30t are wound around in a quadrangular shape. In addition, the movable body 3 is divided into the lens holder 12 and the coil holder 13. Therefore, it may be structured that, after the lens drive coils 30s and 30t have been wound around the coil holder 13, the lens holder 12 is accommodated and disposed in the lens holder accommodating opening 130 and thus, when the lens drive coils 30s and 30t are to be wound around, a problem such as damage of the lens 121 can be prevented.

Further, the movable body 3 of the photographing unit 1 holds the magnetic piece 61 at a position on an object to be photographed side in the optical axis direction with respect to the lens drive magnets 17 for generating a magnetic attraction force between the lens drive magnets 17 and the magnetic piece 61. Therefore, the position in the optical axis direction of the movable body 3 can be controlled with a high degree of accuracy. Accordingly, in the photographing unit 1, a feed back control is not required in which a position in the optical axis direction of the lens 121 is monitored with a sensor or the like to feed back. In accordance with an embodiment, in each of a case that the magnetic piece 61 is provided in the movable body 3 and a case that the magnetic piece 61 is not provided in the movable body 3, a feed back control may be performed in which a position in the optical axis direction of the lens 121 is monitored with a sensor or the like to feed back.

In the embodiment described above, when viewed in the direction of the optical axis "L", the rectangular tube-shaped body part 184 and the lens drive coils 30s and 30t are formed in a quadrangular shape but may be formed in a roughly quadrangular shape. In other words, the rectangular tube-shaped body part 184 and the lens drive coils 30s and 30t may be formed in such a shape that corners of a quadrangle are rounded or that corners of a quadrangle are cut linearly, for example, in an octagonal shape but the corner cut portions are short to be a similar shape to a roughly quadrangle. Further, in the embodiment described above, the rectangular tube-shaped body part 184 and the lens drive coils 30s and 30t are formed in a quadrangular shape. However, the shapes of the rectangular tube-shaped body part and the coil are not limited to a quadrangle and may be a polygon such as a hexagon or an octagon. Further, the lens drive magnet 17 may be fixed to all faces of the rectangular tube-shaped body part of the yoke or may be fixed to faces located every other one in the circumferential direction. In addition, in the embodiment described above, the outer peripheral shape of the coil holder 13 is a polygonal shape. However, it may be structured so that the coil holder 13 is formed in a cylindrical shape and the lens drive coils 30s and 30t wound around in a polygonal shape are fixed to an outer peripheral side face of the coil holder 13 by utilizing protruded parts or the like which are formed on its outer peripheral side face.

In the embodiment described above, the movable body 3 is divided into the lens holder 12 and the coil holder 13, and the body part of the coil holder 13 is formed with the through holes 133a and 133b which structure the hollow portions comprised of a recessed part or a hole that is structured by removing a part of the side wall part of the movable body 3. However, the body part of the lens holder 12 may be formed with a recessed part or a hole by removing a part of the body part and the recessed part or the hole may be utilized as the hollow portion.

In the embodiment described above, the movable body 3 is divided into the lens holder 12 and the coil holder 13 but the movable body may be structured as one piece of component. Also in this case, when the outer peripheral side face or the inner peripheral side face of the movable body 3 is formed with a recessed part or a hole as the hollow portion by removing a part of the outer peripheral side face or the inner peripheral side face, the weight of the movable body 3 is reduced. In this case, it is also preferable that the hollow portion is formed at a position except the corner part like the structure adopted in the embodiment described above in which the through holes 133a and 133b are formed in the coil holder 13.

(Support Structure of Photographing Unit)

In FIGS. 1(a) and 1(b) and FIG. 2, in the photographic optical device 200 in this embodiment, in order to structure the shake correction mechanism, a protruded part 226 formed in a cylindrical tube shape is formed at each of four corner parts on an upper face of the base 220. Lower end parts of totaled four suspension wires 190 (spring member) are held by the four protruded parts 226. In this embodiment, four suspension wires 190 are extended in parallel to the optical axis "L" from each of plural positions located between the X-axis and the Y-axis surrounding the optical axis "L". The suspension wire 190 is formed of nonmagnetic metal such as beryllium copper and nonmagnetic SUS steel material.

Further, the outer peripheral face of the support body 2 in the photographing unit 1 is fixed with a rectangular tube-shaped body part 164 of the yoke 16 (photographing unit side yoke). An object side end part of the body part 164 of the yoke 16 is formed with a flange part 166 in a rectangular frame shape so as to be extended toward an outer peripheral side. Four corner portions of the flange part 166 are formed with holes 169 by which upper end parts of the totaled four suspension wires 190 are held. Therefore, the photographing unit 1 is supported by the fixed body 210 through the four suspension wires 190 in a floated state from the base 220 and the photographing unit 1 is capable of displacing in a direction intersecting with the optical axis "L".

A lower end part of the body part 164 of the yoke 16 which is located on a side of the imaging element 155 is slightly bent toward an inner side and an under face of the bent portion 167 is fixed with a magnetic plate 168 formed in a rectangular frame shape which structures a part of the yoke 16. The magnetic plate 168 is largely extended to an outer side with respect to the body part 164 of the yoke 16.

(Structure of Shake Correction Mechanism)

In this embodiment, a photographing unit drive mechanism for shake correction (movable module drive mechanism) is provided which generates a magnetic drive force for displacing the photographing unit 1 in a direction intersecting the optical axis "L". The photographing unit drive mechanism for shake correction is structured between the photographing unit 1 and the fixed body 210 of a first photographing unit drive mechanism (first movable module drive mechanism) 250x for displacing the photographing unit 1 in the X-axis direction and a second photographing unit drive mechanism (second movable module drive mechanism) 250y for displacing the photographing unit 1 in the Y-axis direction. Structures of the first photographing unit drive mechanism 250x and the second photographing unit drive mechanism 250y will be described below.

First, it is this embodiment, the rectangular tube-shaped body part 184 of the case 18 and the body part 164 of the yoke 16 form a cover part 150 which surrounds the movable body 3 on an outer peripheral side and the lens drive magnet 17 is held by each of four inner peripheral side faces of the cover part 150 (inner peripheral side faces of the rectangular tube-shaped body part 184 of the case 18). Further, each of two outer peripheral side faces which face each other in the X-axis direction of the cover part 150 (outer peripheral side faces of the body part 164 of the yoke 16) is held with a photographing unit drive magnet (movable module drive magnet) 240x formed in a rectangular plate shape which structures the first photographing unit drive mechanism 250x, and each of two outer peripheral side faces which face each other in the Y-axis direction of the cover part 150 is held with a photographing unit drive magnet 240y formed in a rectangular plate shape which structures the second photographing unit drive mechanism 250y.

Magnets having the same structure as each other may be used for the photographing unit drive magnet 240x and the photographing unit drive magnet 240y and, in this embodiment, a permanent magnet having a rectangular flat plate shape is used. Further, each of the photographing unit drive magnet 240x and the photographing unit drive magnet 240y is magnetized so that magnetic poles of its inner face and its outer face are different from each other. For example, in each of the photographing unit drive magnet 240x and the photographing unit drive magnet 240y, its outer face is magnetized in an "N"-pole and its inner face is magnetized in an "S"-pole.

The magnetizing direction of the photographing unit drive magnet 240x and the photographing unit drive magnet 240y is not limited to the above-mentioned pattern. In this embodiment, it may be structured so that the inner faces of the magnets which face each other are magnetized in an "N"-pole (outer faces are in an "S"-pole) and the inner faces of the other magnets which face each other are magnetized in an "S"-pole (outer faces are in an "N"-pole).

Next, on the outer peripheral side of the photographing unit 1, four pieces of a plate-shaped coil holding member 260 are disposed so as to face the photographing unit drive magnets 240x and the photographing unit drive magnets 240y. In this embodiment, four pieces of the coil holding member 260 are fixed to four inner peripheral side faces of the rectangular tube-shaped body part 235 of the fixed cover 230 in a state that protruded parts 262 on the lower end side are fitted to cut-out parts 223 formed in side parts of the base 220. Nonmagnetic material is used for the coil holding member 260.

Each inner face of two pieces of the coil holding member 260 which face each other in the X-axis direction is held with a photographing unit drive coil (movable module drive coil) 230x which is wound around in a rectangular tube shape whose opening is directed to the photographing unit drive magnet 240x and the photographing unit drive coils 230x are faced with the photographing unit drive magnets 240x in an inner and outer direction. Further, an outer side end part of the photographing unit drive magnet 240x is inserted into the inner side of the photographing unit drive coil 230x and the photographing unit drive magnet 240x forms a magnetic field interlinking with respective sides of the photographing unit drive coil 230x from the inner side to the outer side of the photographing unit drive coil 230x.

In this manner, in this embodiment, the first photographing unit drive mechanism 250x is structured of the photographing unit drive coils 230x and the photographing unit drive magnets 240x for displacing the photographing unit 1 in the X-axis direction in a pair at two positions interposing the optical axis "L" therebetween in the X-axis direction. In this embodiment, two photographing unit drive coils 230x are electrically connected so as to generate magnetic drive forces to the photographing unit 1 in the same X-axis direction as each other when energized. Two first photographing unit drive mechanisms 250x are arranged to be a push-pull configuration. For example, when one of the two first photographing unit drive mechanisms 250x applies a moment shown by the arrow "A1" in FIG. 2 to the photographing unit 1, the other applies a moment shown by the arrow "A2" in FIG. 2 to the photographing unit 1. Two first photographing unit drive mechanisms 250x simultaneously apply magnetic drive forces to the photographing unit 1 in the same direction in the X-axis direction. In accordance with an embodiment, in the two first photographing unit drive mechanisms 250x, magnetizing directions of the two photographing unit drive magnets 240x may be set different from each other depending on the connecting method of the two photographing unit drive coils 230x to structure the two first photographing unit drive mechanisms 250x to be a push-pull configuration.

Further, each inner face of two pieces of the coil holding member 260 which face each other in the Y-axis direction is held with a photographing unit drive coil 230y which is wound around in a rectangular tube shape whose opening is directed to the photographing unit drive magnet 240y and the photographing unit drive coils 230y are faced with the photographing unit drive magnets 240y in an inner and outer direction. Further, an outer side end part of the photographing unit drive magnet 240y is inserted into the inner side of the photographing unit drive coil 230y and the photographing unit drive magnet 240y forms a magnetic field interlinking with respective sides of the photographing unit drive coil 230y from the inner side to the outer side of the photographing unit drive coil 230y.

In this manner, in this embodiment, the second photographing unit drive mechanism 250y is structured of the photographing unit drive coils 230y and the photographing unit drive magnets 240y for displacing the photographing unit 1 in the Y-axis direction in a pair at two positions interposing the optical axis "L" therebetween in the Y-axis direction. In this embodiment, two photographing unit drive coils 230y are electrically connected so as to generate magnetic drive forces to the photographing unit 1 in the same direction in the Y-axis direction as each other when energized. Two second photographing unit drive mechanisms 250y are arranged to be a push-pull configuration. Therefore, two second photographing unit drive mechanisms 250y simultaneously apply magnetic drive forces to the photographing unit 1 in the same Y-axis direction. In accordance with an embodiment, in the two second photographing unit drive mechanisms 250y, magnetizing directions of the two photographing unit drive magnets 240y may be set different from each other depending on the connecting method of the two photographing unit drive coils 230y to structure the two second photographing unit drive mechanisms 250y to be a push-pull configuration.

In addition, in this embodiment, an inner face of the coil holding member 260 is fixed with a flat plate-shaped buffer member 268 comprised of an elastic material such as rubber on inner sides of the photographing unit drive coils 230x and 230y. The buffer members 268 face the photographing unit drive magnets 240x and 240y through a predetermined gap space in the inner and outer direction. The buffer member 268 functions to absorb an impact. In other words, when an impact is applied to the photographic optical device 200 to cause the photographing unit 1 to displace in a direction intersecting the Z-axis direction, the photographing unit drive magnets 240x and 240y hit the buffer members 268 and the impact is absorbed by the buffer member 268.

In the first photographing unit drive mechanism 250x and the second photographing unit drive mechanism 250y which are structured as described above, the yoke 16 (photographing unit side yoke) provided in the photographing unit 1 covers the photographing unit drive magnets 240x and 240y and the photographing unit drive coils 230x and 230y on both sides in the optical axis "L" direction through the flange part 166 and the magnetic plate 168.

(Shake Correcting Operation)

In a cell phone with camera on which the photographic optical device 200 structured as described above is mounted, a shake detection sensor (not shown) such as a gyro-sensor is mounted for detecting a shake at the time of photographing and, on the basis of the detection result by the shake detection sensor, a control section which is mounted on the cell phone with camera supplies an electric current to one or both of the photographing unit drive coils 230x and the photographing unit drive coils 230y to displace the photographing unit 1 in one or both of the X-axis direction and the Y-axis direction. When the displacing motions are combined, the photographing unit 1 is displaced over the whole "XY" plane. Accordingly, all the shakes which may be occurred in a cellular phone with camera or the like can be corrected surely. When the shake correction is to be performed, since flexural rigidities of four suspension wires 190 surrounding the optical axis "L" are utilized, the photographing unit 1 is displaced so that the optical axis "L" moves in parallel without the optical axis "L" being inclined.

In accordance with an embodiment, the shake detection sensor may be mounted on the photographic optical device 200 itself or, in a cell phone with camera, the shake detection sensor may be mounted on an apparatus main body except the photographic optical device 200.

(Principal Effects in this Embodiment)

As described above, in the photographic optical device 200 in this embodiment, the photographing unit 1 is supported to be capable of displacing with respect to the fixed body 210 through a plurality of the suspension wires 190 and the photographing unit drive mechanism (first photographing unit drive mechanism 250x and second photographing unit drive mechanism 250y) for displacing the photographing unit 1 is provided between the photographing unit 1 and the fixed body. Therefore, at the time of photographing by using a cellular phone with camera on which the photographic optical device 200 is mounted, even when a shake such as a hand shake or the like is occurred, the shake can be corrected by displacing of the photographing unit 1. Therefore, since the shake correction mechanism is not required to be built into the photographing unit 1, even when the shake correction mechanism cannot be provided in the photographing unit 1 due to a small size of the photographing unit 1, a shake is corrected.

Further, in this embodiment, the paired first photographing unit drive mechanisms 250x are disposed at two positions interposing the optical axis "L" therebetween in the X-axis direction and the paired second photographing unit drive mechanisms 250y are disposed at two positions interposing the optical axis "L" therebetween in the Y-axis direction. Further, two first photographing unit drive mechanisms 250x respectively generate magnetic forces for displacing the photographing unit 1 in the same direction and two second photographing unit drive mechanisms 250y respectively generate magnetic forces for displacing the photographing unit 1 in the same direction. Therefore, different from a case that the first photographing unit drive mechanism 250x is disposed only one side with respect to the pivot part 225 or, different from a case that the second photographing unit drive mechanism 250y is disposed only one side with respect to the optical axis "L", since the driving power is stable, a shake can be corrected with a high degree of accuracy.

In other words, when a distance from the optical axis "L" of one of the two first photographing unit drive mechanisms 250x is displaced in a direction so that the magnetic drive force becomes smaller, a distance from the pivot part 225 of the other of the two first photographing unit drive mechanisms 250x is displaced in a direction so that the magnetic drive force becomes larger and thus the driving power of the first photographing unit drive mechanisms 250x is stable. Similarly, when a distance from the optical axis "L" of one of the two second photographing unit drive mechanisms 250y is displaced in a direction so that the magnetic drive force becomes smaller, a distance from the optical axis "L" of the other of the two second photographing unit drive mechanisms 250y is displaced in a direction so that the magnetic drive force becomes larger and thus the driving power of the second photographing unit drive mechanisms 250y is stable.

Further, when a positional relationship between the photographing unit drive magnet 240x and the photographing unit drive coil 230x which structure the first photographing unit drive mechanism 250x is displaced in a direction so that the magnetic drive force becomes smaller in one of the two first photographing unit drive mechanisms 250x, in the other of the two first photographing unit drive mechanisms 250x, the photographing unit drive magnet 240x and the photographing unit drive coil 230x are displaced in a direction so as to correct the positional displacement between the photographing unit drive magnet 240x and the photographing unit drive coil 230x in one of the two first photographing unit drive mechanisms 250x, in other words, so that the magnetic drive force becomes larger and thus the driving power of the first photographing unit drive mechanisms 250x is stable. Similarly, when a positional relationship between the photographing unit drive magnet 240y and the photographing unit drive coil 230y which structure the second photographing unit drive mechanism 250y is displaced in a direction so that the magnetic drive force becomes smaller in one of the two second photographing unit drive mechanisms 250y, in the other of the two second photographing unit drive mechanisms 250y, the photographing unit drive magnet 240y and the photographing unit drive coil 230y are displaced in a direction so as to correct the positional displacement between the photographing unit drive magnet 240y and the photographing unit drive coil 230y in one of the two second photographing unit drive mechanisms 250y, in other words, so that the magnetic drive force becomes larger and thus the driving power of the second photographing unit drive mechanisms 250y is stable.

In this embodiment, the photographing unit 1 is supported in the fixed body 210 by four suspension wires 190 which are extended from the base 220 of the fixed body 210 toward an object to be photographed side along the direction where the optical axis "L" is extended. Therefore, the photographing unit 1 is displaceably supported on fixed body 210 with a simple structure and a position of the photographing unit 1 can be controlled with a high degree of accuracy and thus the lens position is not required to monitor by a sensor. Further, in this embodiment, the flexural rigidity of the suspension wire 190 which is disposed at three or more positions, in this embodiment, four positions surrounding the optical axis "L", is utilized and thus, when the photographing unit 1 is to be displaced, the attitude of the photographing unit 1 is not varied. Therefore, the optical axis "L" is not inclined and is displaced so that the optical axis "L" moves in parallel.

In this embodiment, in both of the first photographing unit drive mechanism 250x and the second photographing unit drive mechanism 250y, a magnet (photographing unit drive magnets 240x and 240y) is held by the photographing unit 1 which is a movable body, and a coil (photographing unit drive coils 230x and 230y) is held by the fixed body 210. Therefore, the number of wiring lines to the photographing unit 1 that is a movable body is small and thus a structure for the wiring lines can be simplified. Further, when the photographing unit drive coils 230x and 230y are mounted on the fixed body 210, the winding number of the photographing unit drive coils 230x and 230y can be increased and thus a large drive force can be obtained. In addition, since the photographing unit drive magnets 240x and 240y whose mass is smaller than that of the photographing unit drive coils 230x and 230y are provided on the photographing unit 1 which is the movable body, the weight of the photographing unit 1 can be reduced. Accordingly, since the photographing unit 1 can be displaced with a small force, power consumption required for shake correction can be reduced. Further, according to this embodiment, responsiveness to a shake is superior.

In this embodiment, the yoke 16 (photographing unit side yoke) provided in the photographing unit 1 covers the photographing unit drive magnets 240x and 240y and the photographing unit drive coils 230x and 230y on both sides in the optical axis "L" direction through the flange part 166 and the magnetic plate 168. Therefore, since the leakage flux is reduced, when the photographing unit 1 is to be displaced by the first photographing unit drive mechanism 250x and the second photographing unit drive mechanism 250y, a large thrust force can be obtained. As a result, according to this embodiment, responsiveness to a shake is superior.

In this embodiment, the cover part 150 surrounding the support body 2 and the movable body 3 of the photographing unit 1 is provided on the outer peripheral side, and the lens drive magnets 17 are held on the inner peripheral face of the cover part 150 and the photographing unit drive magnets 240x and 240y are held on the outer peripheral face of the cover part 150. Therefore, magnetic interference between the lens drive mechanism 5 and the photographing unit drive mechanism (first photographing unit drive mechanism 250x and second photographing unit drive mechanism 250y) can be prevented.

(Modified Example of First Embodiment)

Figure 5A:
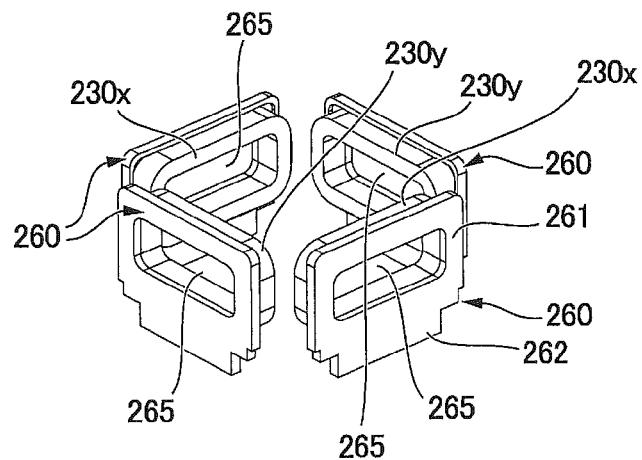
FIG. 5(a) is an explanatory view showing a structure of a coil holding member used in another photographic optical device to which at least an embodiment of the present invention is applied.
Figure 5B:
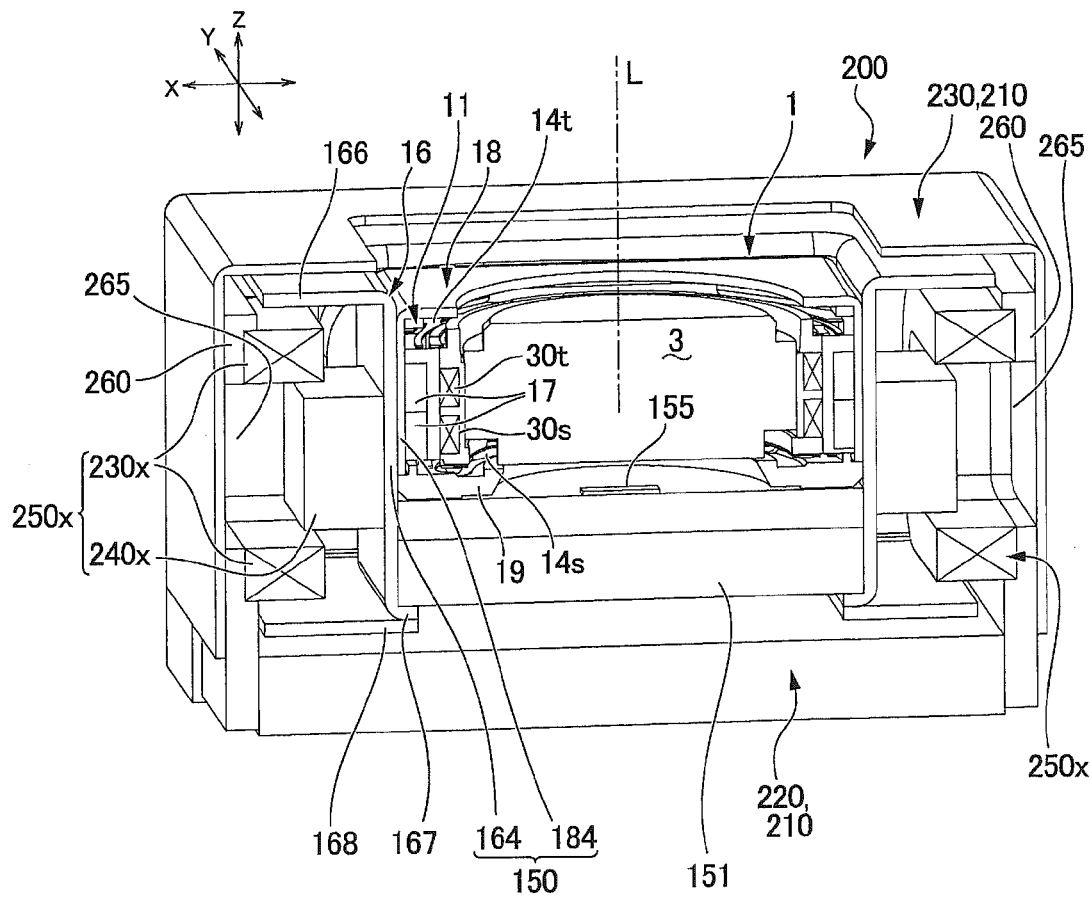
FIG. 5(b) is a longitudinal sectional view showing the photographic optical device which is cut in parallel to the optical axis.

FIG. 5(a) is an explanatory view showing a structure of a coil holding member used in another photographic optical device to which at least an embodiment of the present invention is applied, and FIG. 5(b) is a longitudinal sectional view showing the photographic optical device which is cut in parallel to the optical axis.

In the first embodiment, a plate shaped member which is not formed with an opening part is used as the coil holding member 260. However, in this embodiment, as shown in FIGS. 5(a) and 5(b), the coil holding member 260 is formed of magnetic material and an opening part 265 comprised of a through hole is formed in a portion of the coil holding member 260 which is located on an inner side of the photographing unit drive coils 230x and 230y. The opening parts 265 face the photographing unit drive magnets 240x and 240y on an outer side. When this structure is adopted, the coil holding members 260 function as back yokes of the coil 230x and 230y (fixed body side yoke). Therefore, a degree is enhanced in which a magnetic field generated by the photographing unit drive magnets 240x and 240y is interlinked with the photographing unit drive coils 230x and 230y and thus the drive efficiencies of the first photographing unit drive mechanism 250x and the second photographing unit drive mechanism 250y can be enhanced.

In the example shown in FIGS. 5(a) and 5(b), the buffer member 268 shown in FIGS. 1(a) and 1(b) and FIG. 2 is not provided but, also in the example shown in FIGS. 5(a) and 5(b), the buffer member 268 shown in FIGS. 1(a) and 1(b) and FIG. 2 may be provided.

Second Embodiment
(Entire Structure of Photographic Optical Device)

Figure 7:
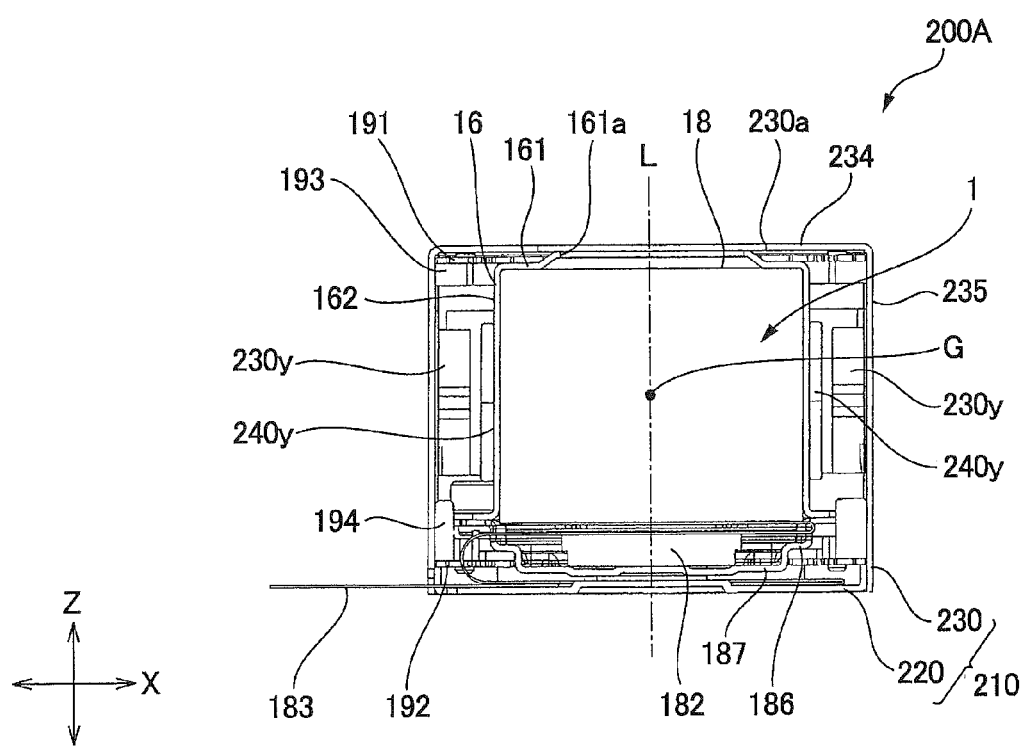
[FIG. 7]

FIG. 6(a) is an outward appearance view showing a photographic optical device in accordance with a second embodiment of the present invention which is viewed from obliquely above on an object to be photographed side, and FIG. 6(b) is its exploded perspective view. FIG. 7 is a longitudinal sectional view showing the photographic optical device in accordance with the second embodiment which is cut in parallel to the optical axis. The photographic optical device in accordance with the second embodiment is provided with common portions to the photographic optical device 200 in accordance with the first embodiment and thus the same reference signs are used in the common portions and their descriptions are omitted.

A photographic optical device 200A shown in FIGS. 6(a) and 6(b) and FIG. 7 is formed in a substantially rectangular parallelepiped shape as a whole. The photographic optical device 200A includes a base 220 in a rectangular plate shape and a box-shaped fixed cover 230 which covers an upper side of the base 220. The base 220 and the fixed cover 230 structure a fixed body 210. The fixed cover 230 is in a rectangular shape when viewed from the optical axis "L" direction and is provided with a rectangular upper plate part 234 and a rectangular tube-shaped body part 235 which is extended downward from an outer circumferential edge of the upper plate part 234. A circular window 230a for light transmission is formed in the upper plate part 234. An inner side of the fixed cover 230 is structured with the photographing unit 1 and a shake correction mechanism for displacing the photographing unit 1 to perform shake correction.

The photographing unit 1 is provided with the yoke 16 which covers its outer peripheral side. The yoke 16 is formed in a rectangular shape when viewed in the Z-axis direction and is provided with a rectangular top plate part 161 on an object to be photographed side and four side plate parts 162 which are extended to a rear side from an outer circumferential edge of the top plate part 161. The top plate part 161 of the yoke 16 is formed with a circular opening part 161a. A rear end part of the yoke 16 is opened to form a flange part which is bent toward an outer side from its opening edge. A metal sensor cover 186 is connected with a rear side of the yoke 16 by utilizing the flange part so as to cover the opening.

A shake detection sensor 182 for detecting inclination of the photographing unit 1 is disposed on the sensor cover 186. As a shake detection sensor 182, a surface mounting type gyro-sensor (angular velocity sensor) may be used and the shake detection sensor 182 is mounted on a sensor flexible circuit board 183. The gyro-sensor is a sensor which detects angular velocities of two axes, preferably two axes perpendicular to each other. In this embodiment, the gyro-sensor is structured to detect angular velocities of two axes, i.e., an X-axis and a Y-axis. In this embodiment, the shake detection sensor 182 is mounted on the photographing unit 1 to perform shake correction. Therefore, the control section (not shown) performs a closed loop control on the first and the second photographing unit drive mechanisms 250x and 250y so that an integral value of an angular velocity detected by the shake detection sensor 182, i.e., angular displacement becomes zero. A gap space which is opened in the X-axis direction is formed between the sensor cover 186 and the yoke 16 and the flexible printed circuit board 183 is drawn out through the gap space. The flexible printed circuit board 183 is formed in a shape in which a substantially rectangular sheet extending in the X-axis direction is folded in the Z-axis direction at three positions in the longitudinal direction.

The shake correction mechanism generates magnetic drive forces for rocking the photographing unit 1 around the X-axis and the Y-axis on the fixed body 210 and generates a magnetic drive force for displacing the photographing unit 1 in the Z-axis direction on the fixed body 210 in a pair at two positions interposing the optical axis "L" and facing each other. In this embodiment, the photographing unit drive mechanism for shake correction is structured of a first photographing unit drive mechanism 250x which rocks the photographing unit 1 around the X-axis and moves the photographing unit 1 in the Z-axis direction, and a second photographing unit drive mechanism 250y which rocks the photographing unit 1 around the Y-axis and moves the photographing unit 1 in the Z-axis direction. The first and the second photographing unit drive mechanisms 250x and 250y are structured on an outer peripheral side of the yoke 16.

(Support Structure of Photographing Unit)

Figure 8A:
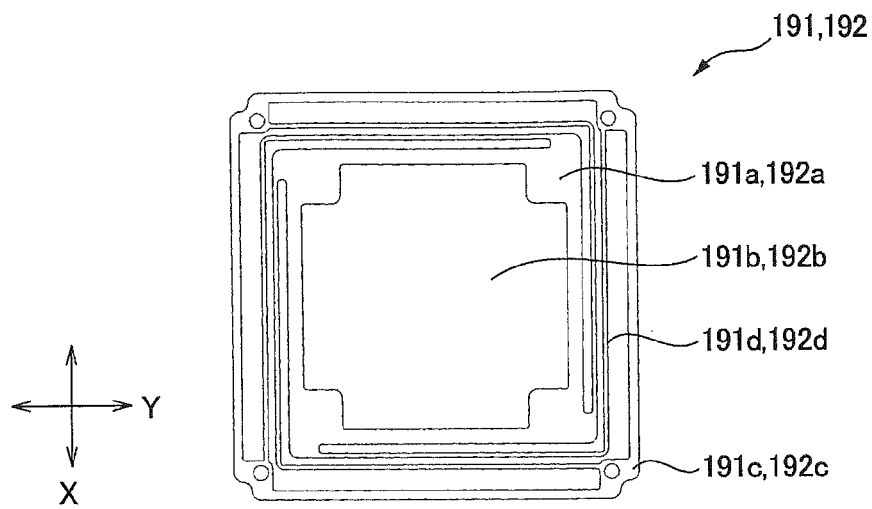
FIG. 8(a) is a plan view showing a flat spring which supports a photographing unit of the photographic optical device in accordance with the second embodiment and FIG. 8(b) is its perspective view.
Figure 8B:
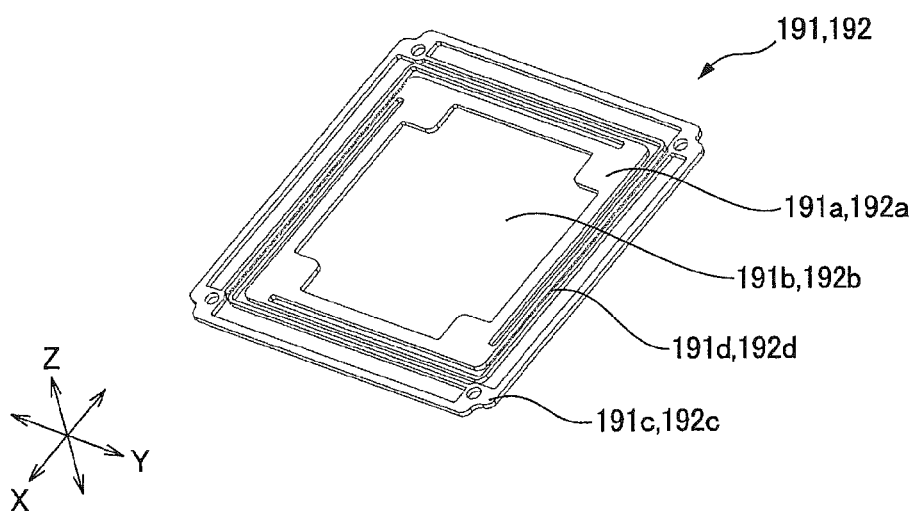

FIG. 8(a) is a plan view showing a first flat spring which supports the photographing unit 1 and FIG. 8(b) is its perspective view. In this embodiment, the photographing unit 1 is supported by a first flat spring 191 (first spring member) and a second flat spring 192 (second spring member) which are disposed on both sides interposing the photographing unit drive mechanism therebetween in the Z-axis direction and connected with the photographing unit 1 and the fixed body 210.

The first and the second flat springs 191 and 192 are formed in the same shape as each other and formed in a rectangular shape in a plan view. The first and the second flat springs 191 and 192 are a gimbal spring 280 which is made of metal such as phosphor bronze, beryllium copper or nonmagnetic SUS steel material and is formed by means of that a thin plate having a predetermined thickness is performed by press working or etching processing with the use of photo lithography technique.

Inner peripheral side connecting parts 191a and 192a in a substantially rectangular shape which are attached to the photographing unit 1 are formed at center portions of the first and the second flat springs 191 and 192. Rectangular holes 191b and 192b are formed at center regions of the inner peripheral side connecting parts 191a and 192a. The first flat spring 191 is fixed to the yoke 16 by a method such as using an adhesive so that the opening part 161a is located on the inner side of the rectangular hole 191b. The second flat spring 192 is fixed to the sensor cover 186 by a method such as using an adhesive in a state that a circular portion 187 that is a bottom plate part of the sensor cover 186 which is protruded to the rear side is inserted into the rectangular hole 192b.

Outer peripheral side connecting parts 191c and 192c in a rectangular frame shape are formed on the outer peripheral sides of the first and the second flat springs 191 and 192. The outer peripheral side connecting part 191c of the first flat spring 191 is fixed to an upper face of a rectangular frame body 193 and attached to the inner peripheral face of the fixed cover 230 through the frame body 193. The outer peripheral side connecting part 192c of the second flat spring 192 is fixed to an under face of a rectangular frame body 194 and attached to the inner peripheral face of the fixed cover 230 through the frame body 194. [0112] Four arm parts 191d and 192d which are extended from the inner peripheral side connecting parts 191a and 192a and connected with the outer peripheral side connecting parts 191c and 192c are formed between the inner peripheral side connecting parts 191a and 192a and the outer peripheral side connecting parts 191c and 192c. The four arm parts 191d and 192d are provided with the same shape and size as each other and disposed at equal angular intervals around the optical axis "L". Further, the respective arm parts 191d and 192d are extended from corner portions of the inner peripheral side connecting parts 191a and 192a in the X-axis direction and the Y-axis direction and connected with the corner parts of the outer peripheral side connecting parts 191c and 192c which are located at angular positions separated at 180 degrees from each other around the optical axis "L". In addition, the respective arm parts 191d and 192d are formed to have a thinner width and its thickness dimension and its width dimension are formed to be substantially the same as each other. In this manner, the first and the second flat springs 191 and 192 are deformable around the X-axis, around the Y-axis, in the X-axis direction, in the Y-axis direction and in the Z-axis direction, and the photographing unit is displaceably supported around the X-axis, around the Y-axis, in the X-axis direction, in the Y-axis direction and in the Z-axis direction.

In this embodiment, the gravity center "G" of the photographing unit 1 is located between the first flat spring 191 and the second flat spring 192. Further, the first flat spring 191 and the second flat spring 192 are attached so as to apply urging forces to the photographing unit 1 toward the base 220 and, in a state that the shake correction mechanism is not operated, the photographing unit 1 is pressed against the base 220.

(Structure of Shake Correction Mechanism)

The photographing unit drive magnet 240x structuring the first photographing unit drive mechanism 250x is held by outer faces of two side plate parts 162 of the yoke 16 which face each other in the Y-axis direction in the photographing unit 1. The photographing unit drive magnet 240y structuring the second photographing unit drive mechanism 250y is held by outer faces of the other two side plate parts 162 which face each other in the X-axis direction.

The photographing unit drive magnets 240x and 240y are structured of two pieces of flat plate-shaped permanent magnets arranged in the Z-axis direction. In the flat plate-shaped permanent magnet, its outer face side and its inner face side are magnetized in different poles from each other. Further, in two pieces of the flat plate-shaped permanent magnets arranged in the Z-axis direction, the magnetizing directions are opposite to each other. In addition, a pair of photographing unit drive magnets 240x which face each other with the optical axis "L" interposing therebetween are disposed so that their magnetizing directions are the same as each other in the Z-axis direction when viewed from the optical axis "L" side. Similarly, a pair of photographing unit drive magnets 240y which face each other with the optical axis "L" interposing therebetween are disposed so that their magnetizing directions are the same as each other in the Z-axis direction when viewed from the optical axis "L" side.

In the fixed body 210, the photographing unit drive coils 230x structuring the first photographing unit drive mechanism 250x are held on inner peripheral face portions of the body part 235 of the fixed cover 230 facing each other in the Y-axis direction, and the photographing unit drive coils 230y structuring the second photographing unit drive mechanism 250y are held on inner peripheral face portions of the body part 235 of the fixed cover 230 facing each other in the X-axis direction. The photographing unit drive coils 230x and 230y respectively face the photographing unit drive magnets 240x and 240y. Two effective side parts located in the Z-axis direction of the photographing unit drive coils 230x and 230y are respectively faced with two pieces of the flat plate-shaped permanent magnets arranged in the Z-axis direction of the photographing unit drive magnets 240x and 240y.

Further, two photographing unit drive coils 230x are wound around in the same directions as each other when viewed from the optical axis "L" and connected in series with each other. Further, an intermediate terminal 253 is provided in the connecting wire which connects the photographing unit drive coil 230x disposed on one side with respect to the optical axis "L" with the photographing unit drive coil 230x disposed on the other side (see FIGS. 9(a) and 9(b)). Similarly, the respective photographing unit drive coils 230y are wound around in the same directions as each other when viewed from the optical axis "L" and connected in series with each other. Further, an intermediate terminal 253 is provided in the connecting wire which connects the photographing unit drive coil 230y disposed on one side of the optical axis "L" with the photographing unit drive coil 230y disposed on the other side of the optical axis "L".

In this embodiment, the first photographing unit drive mechanism 250x and the second shake correction magnetic drive mechanism 250y are respectively provided with energization control means (not shown) which control energization to the photographing unit drive coils 230x and 230y on the basis of detection results by the shake detection sensor 182.

(Shake Correcting Operation)

Figure 9A:
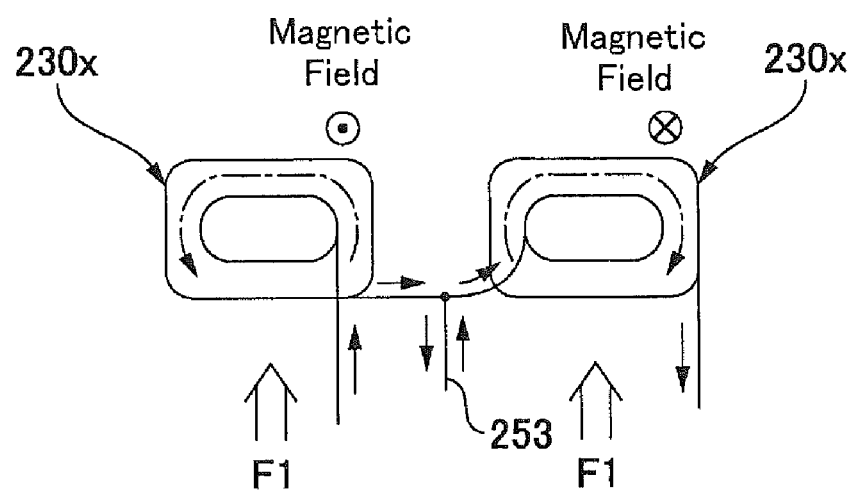
FIGS. 9(a) and 9(b) are explanatory views schematically showing an operation where an energization control means supplies an electric current to photographing unit drive coils in the second embodiment.
Figure 9B:
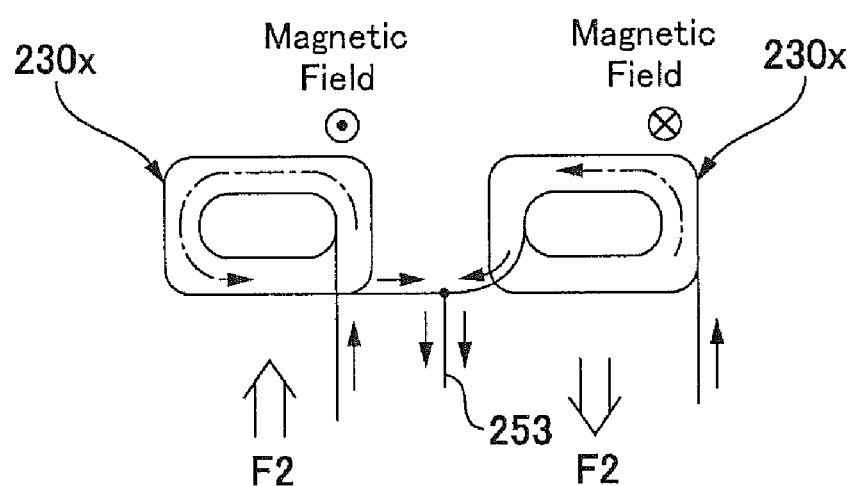

FIGS. 9(a) and 9(b) are explanatory views schematically showing an operation (first mode and second mode) where an energization control means supplies an electric current to a pair of the photographing unit drive coils 230x. FIG. 9(a) is a view schematically showing a current flow when a thrust force for moving the photographing unit 1 in the Z-axis direction is applied to the photographing unit 1 in a first mode, and FIG. 9(b) is a view schematically showing a current flow when a moment for rocking the photographing unit 1 in a direction intersecting the optical axis "L" is applied to the photographing unit 1 in a second mode. In FIGS. 9(a) and 9(b), only a pair of the photographing unit drive coils 230x are shown which are taken out and viewed at a separated position from the photographing unit 1 on one side of the optical axis "L". Therefore, although the two photographing unit drive coils 230x are wound around in the same direction as each other when viewed from the optical axis "L", in FIGS. 9(a) and 9(b), the two photographing unit drive coils 230x are expressed so as to be wound around in the opposite direction to each other.

First, as shown in FIG. 9(a), in the first mode, the energization control means supplies an electric current from the photographing unit drive coil 230x disposed on one side with respect to the optical axis "L" to the intermediate terminal 253 and supplies an electric current from the intermediate terminal 253 to the photographing unit drive coil 230x disposed on the other side with respect to the optical axis "L". As a result, electromagnetic forces are generated between the movable module drive coil 230x and the movable module drive magnet 240x and thus, as shown by the arrows "F1", two first photographing unit drive mechanisms 250x apply thrust forces for displacing the photographing unit 1 in the optical axis "L" direction. Similar operations are performed to the photographing unit drive coils 230y. Therefore, the photographing unit 1 which has been pressed toward the base 220 by urging forces of the first and the second flat springs 191 and 192 is moved in the Z-axis direction to be a state in which the photographing unit 1 is capable of being rocked.

Next, in the second mode for rocking the photographing unit 1 in a direction intersecting the optical axis "L" on the basis of detection results of the shake detection sensor 182, as shown in FIG. 9(b), an electric current is supplied through the photographing unit drive coil 230x disposed on one side with respect to the optical axis "L" to the intermediate terminal 253 and an electric current is supplied through the photographing unit drive coil 230x disposed on the other side with respect to the optical axis "L" to the intermediate terminal 253. As a result, electromagnetic forces are generated between the movable module drive coils 230x and the movable module drive magnets 240x and thus, as shown by the arrows "F2", two first photographing unit drive mechanisms 250x apply moments for rocking the photographing unit 1 in a direction intersecting the optical axis "L". Similar operations are performed to the photographing unit drive coils 230y. Therefore, when the rocking operations around the X-axis and the Y-axis are combined, the photographing unit 1 can be rocked over the entire "XY" plane. Accordingly, when energization for the first mode and energization for the second mode are simultaneously performed, in other words, when energization for the second mode is superimposed on energization for the first mode, the photographing unit 1 having been pressed toward the base 220 by urging forces of the first and the second flat springs 191 and 192 is moved in the Z-axis direction to be a state where the photographing unit 1 is capable of being rocked and the photographing unit 1 can be rocked over the entire "XY" plane and all shakes which may be occurred in a cellular phone with camera or the like can be corrected surely. In this embodiment, when energization for the first mode and energization for the second mode are superimposed on each other, electric currents having different current values are supplied to the two photographing unit drive coils 230x.

In this embodiment, a center of thrust forces for displacing an attitude of the photographing unit 1 by the first photographing unit drive mechanism 250x and the second photographing unit drive mechanism 250y, a center of restoring torques with which the first flat spring 191 and the second flat spring 192 having deformed by displacement of the attitude of the photographing unit 1 are going to return to their original shapes, the gravity center "G" of the photographing unit 1, and a rocking center of the photographing unit 1 are structured to be coincided with each other.

In accordance with an embodiment, even in a case that a winding direction of the photographing unit drive coil 230x and a magnetizing direction of the photographing unit drive magnet 240x are different from the structure described above, the first mode can be performed. In other words, when magnetizing directions of the photographing unit drive magnets 240x and current-supply directions of the respective movable module drive coils 230x are selected so that an electromagnetic force acting between the movable module drive coil 230x and the movable module drive magnet 240x disposed on one side with respect to the optical axis "L" and an electromagnetic force acting between the movable module drive coil 230x and the movable module drive magnet 240x on the other side with respect to the optical axis "L" are generated in the same direction as each other in the optical axis "L" direction, the first mode is performed. Similarly, when magnetizing directions of the photographing unit drive magnets 240x and current-supply directions of the respective movable module drive coils 230x are selected so that an electromagnetic force acting between the movable module drive coil 230x and the movable module drive magnet 240x disposed on one side with respect to the optical axis "L" and an electromagnetic force acting between the movable module drive coil 230x and the movable module drive magnet 240x on the other side with respect to the optical axis "L" are generated in the opposite direction to each other in the optical axis "L" direction, the second mode is performed.

(Principal Effects in this Embodiment)

According to this embodiment, the photographing unit 1 is supported by the first flat spring 191 and the second flat spring 192, which are disposed on both sides interposing the first and the second photographing unit drive mechanisms 250x and 250y therebetween in the Z-axis direction, so as to be capable of displacing around the X-axis, around the Y-axis, in the X-axis direction, in the Y-axis direction and in the Z-axis direction. Therefore, a center of thrust forces for displacing an attitude of the photographing unit 1 by the first photographing unit drive mechanism 250x and the second photographing unit drive mechanism 250y and a center of restoring torques with which the first flat spring 191 and the second flat spring 192 having deformed by displacement of the attitude of the photographing unit 1 are going to return to their original shapes, are disposed between the first and the second flat springs 191 and 192. Further, these positions can be coincided with each other between the first and the second flat springs 191 and 192. Therefore, the rocking center of the photographing unit 1 can be disposed between the first and the second flat springs 191 and 192. As a result, when the photographing unit 1 is rocked, forces acting on the first and the second flat springs 191 and 192 are smaller and thus the first and the second photographing unit drive mechanisms 250x and 250y are capable of rocking the photographing unit 1 with a small torque. Further, spring forces of the first and the second flat springs 191 and 192 which rockably support the photographing unit 1 may be smaller. Therefore, the photographing unit 1 can be displaced efficiently.

Further, according to this embodiment, the gravity center "G" of the photographing unit 1 is located at an intermediate position of the first flat spring 191 and the second flat spring 192 and thus, when an attitude of the photographic optical device 200A is varied, inclination of the photographing unit 1 with respect to the photographic optical device 200A can be reduced or prevented. As a result, a range that the photographing unit 1 is inclined due to an attitude of the photographic optical device 200A is not required to secure as a moving range of the photographing unit 1 and thus the size of the photographic optical device 200A is reduced. Further, magnetic drive forces generated by the first and the second photographing unit drive mechanisms 250x and 250y are not required to be varied due to an attitude of the photographic optical device 200A and thus the photographing unit 1 is displaced efficiently. Further, since a moving range of the photographing unit 1 is smaller, for example, when a restriction member for restricting the moving range of the photographing unit 1 is disposed, a gap space between the photographing unit 1 and the restriction member can be made narrower. As a result, even in a case that the photographing unit 1 is collided with the restriction member when an impact or the like is applied to the photographic optical device 200A, the occurred impact becomes smaller and thus deformation of the photographing unit 1 can be prevented. Therefore, the photographic optical device 200A can be structured as an impact-resistant device. In addition, a structure for supporting the photographing unit 1 is not required on an outer side in the Z-axis direction of the photographing unit 1. Therefore, the photographic optical device 200A can be structured thinner in the Z-axis direction.

Further, the first and the second flat springs 191 and 192 are capable of deforming around the X-axis, around the Y-axis, in the X-axis direction, in the Y-axis direction and in the Z-axis direction and deform following displacement of the photographing unit 1 around the X-axis, around the Y-axis, in the X-axis direction, in the Y-axis direction and in the Z-axis direction. Therefore, in a case that the center of the thrust forces by the first and the second photographing unit drive mechanisms 250x and 250y, the center of the restoring torques by the first flat spring 191 and the second flat spring 192, and the center of the photographing unit 1 are located between the first flat spring 191 and the second flat spring 192, when a strong impact is applied to the photographic optical device 200A, the photographing unit 1 may be moved in a wide range. However, since the arm parts 191d and 192d are deformed following displacement of the photographing unit 1, the first and the second flat springs 191 and 192 are not damaged.

Further, according to this embodiment, the photographing unit 1 is capable of rocking around the X-axis and around the Y-axis and the photographing unit 1 is capable of moving in the Z-axis direction by means of that current-supplies to the respective photographing unit drive coils 230x and 230y of the first and the second photographing unit drive mechanisms 250x and 250y are controlled by the first and the second energization control means. In addition, when the first and the second photographing unit drive mechanisms 250x and 250y are not operated, the photographing unit 1 is pressed against the base 220 by the first and the second flat springs 191 and 192 and, when the shake correction mechanism is operated, the first and the second photographing unit drive mechanisms 250x and 250y generate magnetic drive forces for separating the photographing unit 1 from the base 220 against the urging forces of the first and the second flat springs 191 and 192. As a result, during that the first and the second photographing unit drive mechanisms 250x and 250y are not operated such that the photographic optical device 200A is carried, the photographing unit 1 is fixed to the base 220 and is not moved. Therefore, a problem is prevented that, when the photographic optical device 200A is carried or the like, the photographing unit 1 and the fixed body 210 are collided with each other by vibration applied to the photographic optical device 200A to occur an abnormal noise such as rattling or the like.

(Modified Example of Second Embodiment)

In the embodiment described above, when the first and the second photographing unit drive mechanisms 250x and 250y are not operated, the first and the second flat springs 191 and 192 apply the urging forces for pressing the photographing unit 1 against the base 220. However, the urging force may be applied by a mechanical spring such as a flat spring which is different from the first and the second flat springs 191 and 192. Further, a magnetic spring may be structured so that a magnetic body is disposed on the fixed body 210 for generating a magnetic attraction force between the photographing unit drive magnets and the magnetic body and the urging force pressing the photographing unit 1 against the base 220 is applied by the magnetic spring.

Third Embodiment
(Entire Structure of Photographic Optical Device)

Figure 10A:
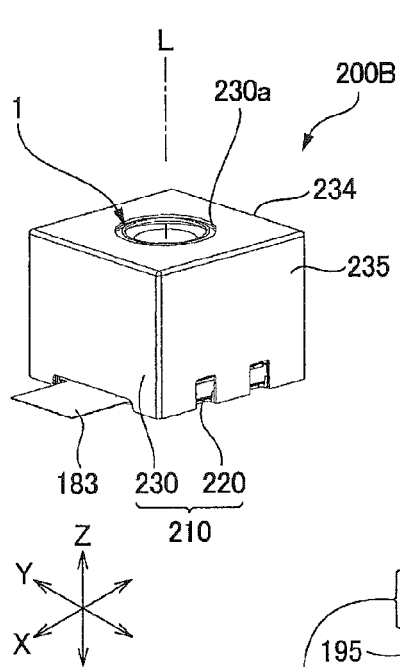
FIG. 10(a) is an outward appearance view showing a photographic optical device in accordance with a third embodiment of the present invention which is viewed from obliquely above on an object to be photographed side.
Figure 10B:
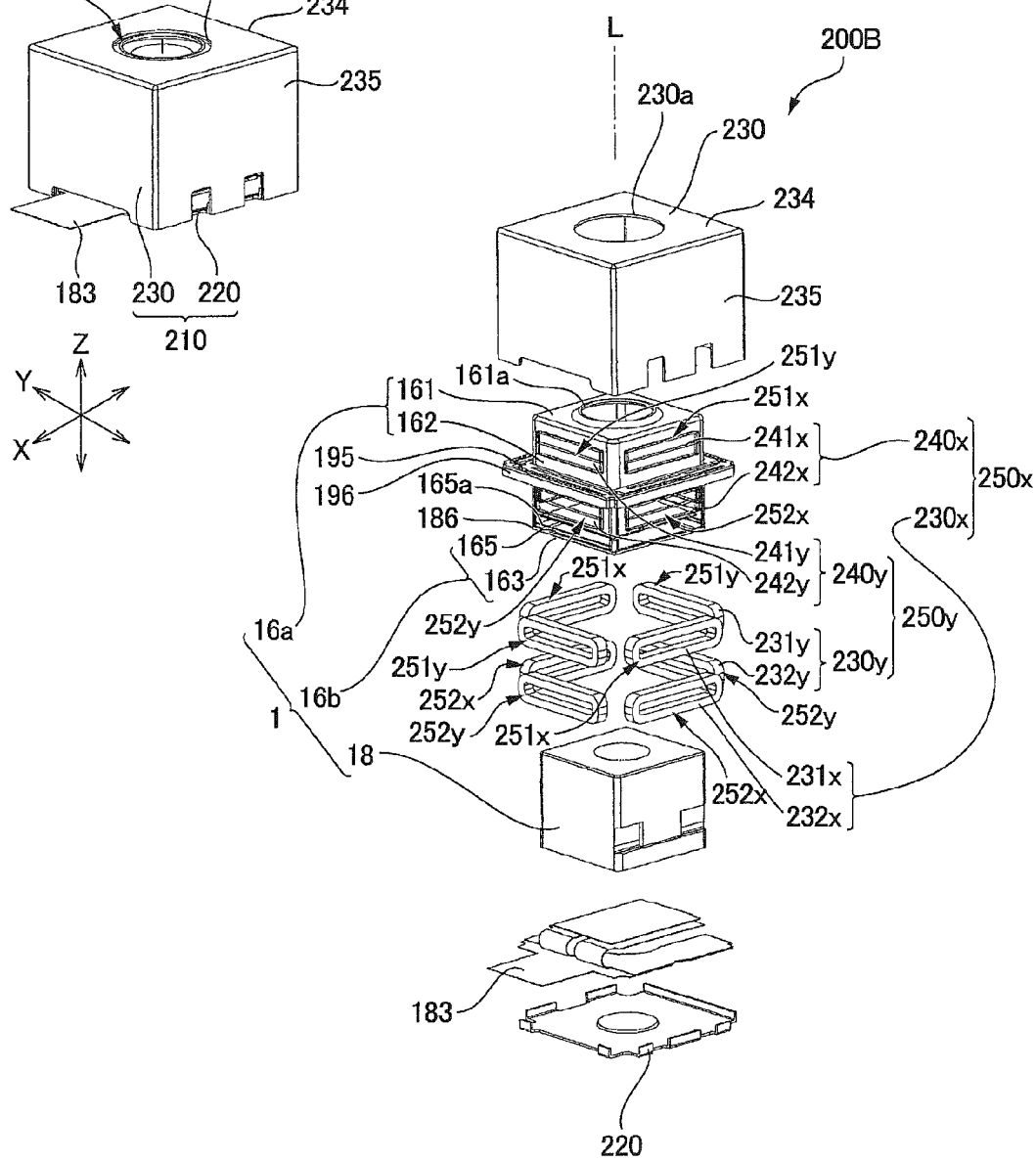
FIG. 10(b) is its exploded perspective view.
Figure 11:
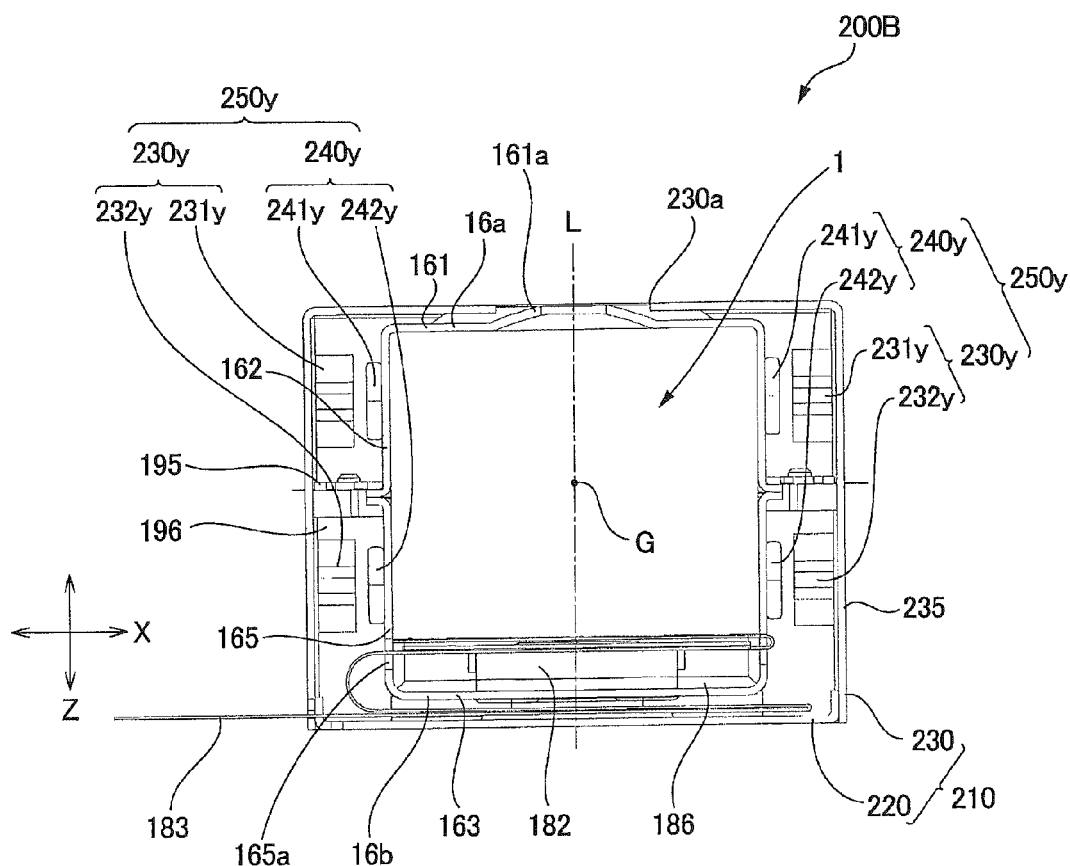
[FIG. 11]

FIG. 10(a) is an outward appearance view showing a photographic optical device in accordance with a third embodiment of the present invention which is viewed from obliquely above on an object to be photographed side, and FIG. 10(b) is its exploded perspective view. FIG. 11 is a longitudinal sectional view showing the photographic optical device in accordance with the third embodiment which is cut by the "X-Z" plane. The photographic optical device in accordance with the third embodiment is provided with common portions to the photographic optical device in accordance with the first embodiment and thus the same reference signs are used in the common portions and their descriptions are omitted.

A photographic optical device 200B shown in FIGS. 10(a) and 10(b) and FIG. 2 is formed in a substantially rectangular parallelepiped shape as a whole. The photographic optical device 200B includes a base 220 in a rectangular plate shape and a box-shaped fixed cover 230 which covers an upper side of the base 220. The base 220 and the fixed cover 230 structure a fixed body 210. The fixed cover 230 is in a rectangular shape when viewed in the optical axis "L" direction and is provided with a rectangular upper plate part 234 and a rectangular tube-shaped body part 235. A circular window 230a for light transmission is formed in the rectangular upper plate part 234. An inner side of the fixed cover 230 is structured with the photographing unit 1 and a shake correction mechanism for displacing the photographing unit 1 to perform shake correction. A shake detection sensor 182 for detecting inclination of the photographing unit 1 is disposed on the rear side of the photographing unit 1 and the shake detection sensor 182 is covered by a box-shaped sensor cover 186 which is attached from the rear side of the photographing unit 1.

The photographing unit 1 is provided with a front side yoke 16a and a rear side yoke 16b which cover an outer peripheral side of the photographing unit 1 from the front side and the rear side with respect to an object to be photographed side. The front side yoke 16a is formed in a rectangular shape when viewed in the Z-axis direction and is provided with a top plate part 161 in a rectangular shape and a side plate part 162 extending to the rear side from the outer circumferential edge of the top plate part 161. A circular opening part 161a is formed in the top plate part 161. A rear end part of the front side yoke 16a is opened and its opening edge is bent toward the outer peripheral side. The rear side yoke 16b is provided with a bottom plate part 163 which covers the sensor cover 186 and a side plate part 165 which is extended to the front side from the outer circumferential edge of the bottom plate part 163. A front end part of the rear side yoke 16b is opened and its opening edge is bent toward the outer peripheral side. A bent portion of the rear end part of the front side yoke 16a and a bent portion of the front end part of the rear side yoke 16b are abutted and connected with each other. The rear side yoke 16b is formed with a gap space 165a which is opened in the X-axis direction and a flexible printed circuit board 183 is drawn out from the gap space. The flexible printed circuit board 183 is formed in a shape such that a substantially rectangular shaped sheet extended in the X-axis direction is folded in the Z-axis direction at three positions in its longitudinal direction.

The shake correction mechanism generates a magnetic drive force for rocking the photographing unit 1 around the X-axis and around the Y-axis on the fixed body 210 and a magnetic drive force for moving the photographing unit 1 in the Z-axis direction on the fixed body 210 at two positions in a pair interposing the optical axis "L" therebetween.

In this embodiment, as the photographing unit drive mechanism for shake correction, a first photographing unit drive mechanism 250x is structured for rocking the photographing unit 1 around the X-axis and for moving the photographing unit 1 in the Z-axis direction, and a second photographing unit drive mechanism 250y is structured for rocking the photographing unit 1 around the Y-axis and for moving the photographing unit 1 in the Z-axis direction, The first photographing unit drive mechanism 250x is structured of a front side photographing unit drive mechanism 251x structured on an outer peripheral side of the front side yoke 16a and a rear side photographing unit drive mechanism 252x structured on an outer peripheral side of the rear side yoke 16b. The front side photographing unit drive mechanism 251x and the rear side photographing unit drive mechanism 252x are disposed at two positions separated from each other in the optical axis "L" direction.

The second photographing unit drive mechanism 250y is, similarly to the first photographing unit drive mechanism 250x, structured of a front side photographing unit drive mechanism 251y structured on an outer peripheral side of the front side yoke 16a and a rear side photographing unit drive mechanism 252y structured on an outer peripheral side of the rear side yoke 16b. The front side photographing unit drive mechanism 251y and the rear side photographing unit drive mechanism 252y are disposed at two positions separated from each other in the optical axis "L" direction.

The front side photographing unit drive mechanisms 251x and 251y are located at the same positions as each other in the Z-axis direction, and the rear side photographing unit drive mechanisms 252x and 252y are located at the same positions as each other in the Z-axis direction.

(Support Structure of Photographing Unit)

Figure 12A:
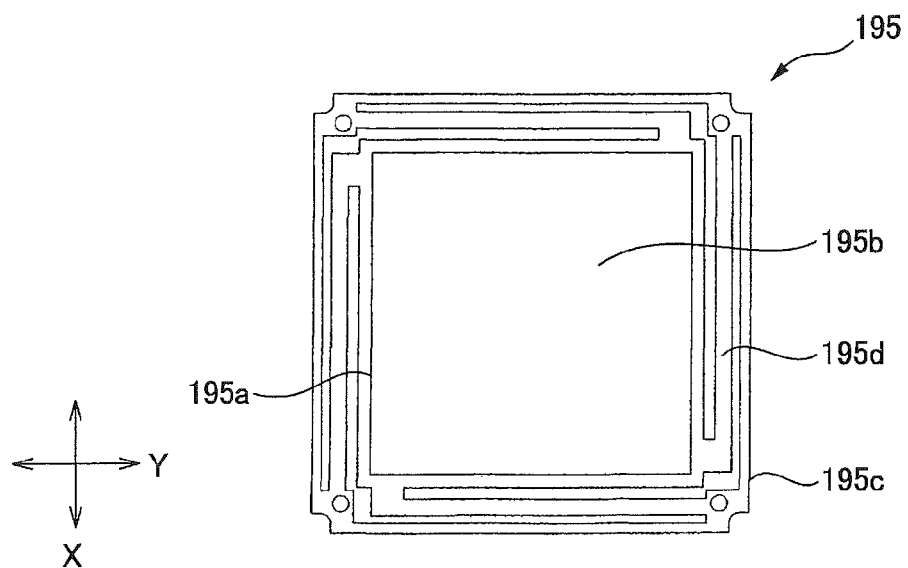
FIG. 12(a) is a plan view showing a flat spring which supports a photographing unit of the photographic optical device in accordance with the third embodiment and FIG. 12(b) is its perspective view.
Figure 12B:
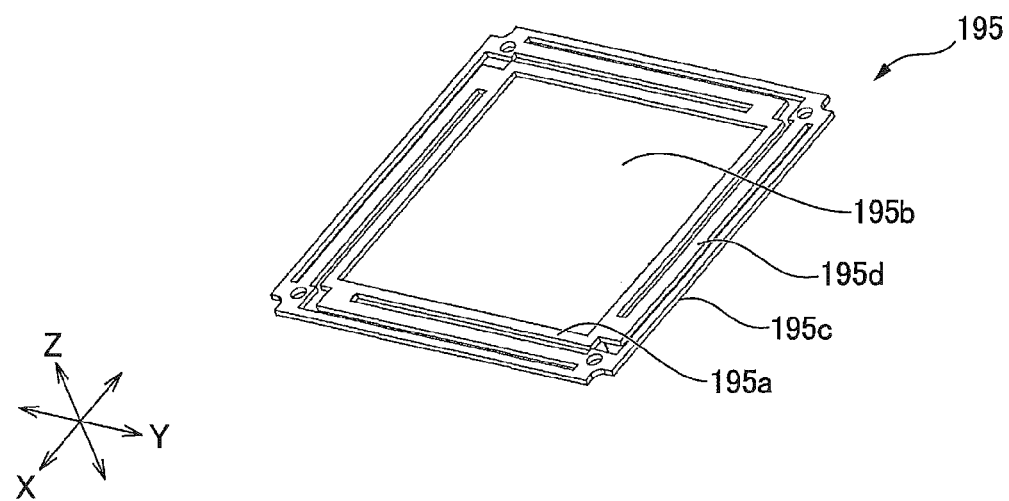

FIG. 12(a) is a plan view showing a flat spring 195 which supports the photographing unit 1 and FIG. 12(b) is its perspective view. In this embodiment, the photographing unit 1 is supported by one piece of flat spring 195 which connects the photographing unit 1 with the fixed body 210. The flat spring 195 is disposed between the front side photographing unit drive mechanisms 251x and 251y and the rear side photographing unit drive mechanisms 252x and 252y in the Z-axis direction.

As shown in FIG. 12(a), the flat spring 195 is formed in a rectangular shape in a plan view. The flat spring is a gimbal spring 280 which is made of metal such as phosphor bronze, beryllium copper or nonmagnetic SUS steel material and is formed by means of that a thin plate having a predetermined thickness is performed by press working or etching processing with the use of photo lithography technique.

An inner peripheral side connecting part 195a in a frame shape which is attached to the photographing unit 1 is formed at a center portion of the flat spring 195. A rectangular hole 195b is formed at a center region of the inner peripheral side connecting part 195a. The front side yoke 16a is inserted on an inner side of the rectangular hole 195b of the flat spring 195 and the inner peripheral side connecting part 195a is fixed to the bent portion by a method such as using an adhesive.

An outer peripheral side connecting part 195c in a rectangular frame shape is formed on the outer peripheral side of the flat spring 195. The outer peripheral side connecting part 195c of the flat spring 195 is fixed to a frame body 196 in a rectangular frame shape and the flat spring 195 is attached to an inner peripheral face of the fixed cover 230 through the frame body 196.

Four arm parts 195d which are extended from the inner peripheral side connecting part 195a and connected with the outer peripheral side connecting part 195c are formed between the inner peripheral side connecting part 195a and the outer peripheral side connecting part 195c. The four arm parts 195d are provided with the same shape and size as each other and disposed at equal angular intervals around the optical axis "L". Further, the respective arm parts 195d are extended from corner portions of the inner peripheral side connecting parts 195a in the X-axis direction or the Y-axis direction and connected with the corner parts of the outer peripheral side connecting parts 195c which are located at angular positions separated with 90 degrees from each other around the optical axis "L". Further, each of the arm parts 195d is formed to be thin in the Z-axis direction and formed to have a predetermined width in the X-axis direction and the Y-axis direction. In this manner, the flat spring 195 is capable of deforming around the X-axis, around the Y-axis and in the Z-axis direction, and the photographing unit 1 is supported to be capable of displacing around the X-axis, around the Y-axis and in the Z-axis direction. Further, since the flat spring 195 is hard to be deformed in the X-axis direction and in the Y-axis direction, the photographing unit 1 is moved in the Z-axis direction but hard to be moved in the X-axis direction and the Y-axis direction.

In this embodiment, the gravity center of the photographing unit 1 is located between the front side photographing unit drive mechanisms 251x and 251y and the rear side photographing unit drive mechanisms 252x and 252y. Further, the flat spring 195 is attached so that the photographing unit 1 is urged toward the base 220 and, in a state that the shake correction mechanism is not operated, the photographing unit 1 is pressed against the base 220.

(Structure of Shake Correction Mechanism)

Photographing unit drive magnets 240x structuring the first photographing unit drive mechanism 250x are structured of magnets 241x of the front side photographing unit drive mechanism 251x and magnets 242x of the rear side photographing unit drive mechanism 252x. The magnets 241x and 242x are respectively held by outer faces facing each other in the Y-axis direction of two side plate parts 162 and 165 of the front side yoke 16a and the rear side yoke 16b. The magnets 241x and 242x are structured of two pieces of a flat plate-shaped permanent magnet arranged in the Z-axis direction and, in the flat plate-shaped permanent magnet, the outer face side and the inner face side are magnetized in different poles from each other. In two pieces of the flat plate-shaped permanent magnets arranged in the Z-axis direction, the magnetizing directions are opposite to each other. Further, arrangements of the magnetizing direction of the magnets 241x and 242x are the same as each other when viewed from the optical axis direction. Further, a pair of magnets 241x and 242x which face each other with the optical axis "L" interposing therebetween are disposed so that their magnetizing directions are the same as each other in the Z-axis direction.

Photographing unit drive magnets 240y structuring the second photographing unit drive mechanism 250y are structured of magnets 241y of the front side photographing unit drive mechanism 251y and magnets 242y of the rear side photographing unit drive mechanism 252y. The magnets 241y and 242y are respectively held by outer faces facing each other in the X-axis direction of two side plate parts 162 and 165 of the front side yoke 16a and the rear side yoke 16b. The magnets 241y and 242y are structured of two pieces of a flat plate-shaped permanent magnet arranged in the Z-axis direction and, in the flat plate-shaped permanent magnet, the outer face side and the inner face side are magnetized in different poles from each other. In two pieces of the flat plate-shaped permanent magnets arranged in the Z-axis direction, the magnetizing directions are opposite to each other. Further, arrangements of the magnetizing direction of the magnets 241y and 242y are the same as each other when viewed from the optical axis direction. Further, a pair of magnets 241y and 242y which face each other with the optical axis "L" interposing therebetween are disposed so that their magnetizing directions are the same as each other in the Z-axis direction.

Photographing unit drive coils 230x which structure the first photographing unit drive mechanism 250x are structured of a coil 231x of the front side photographing unit drive mechanism 251x and a coil 232x of the rear side photographing unit drive mechanism 252x. The coils 231x and 232x are structured of two rectangular flat coils which are juxtaposedly arranged in the Z-axis direction and are respectively held by inner peripheral face portions facing in the Y-axis direction of the body part 235 of the fixed cover 230. Two effective side parts located in the Z-axis direction of the coils 231x and 232x respectively face two pieces of the respective flat plate-shaped permanent magnets of the magnets 241x and 242x arranged in the Z-axis direction.

The coils 231x and 232x are wound around in the same directions as each other when viewed from the optical axis "L" and serially-connected from the coils 231x and 232x disposed on one side with respect to the optical axis "L" to the coils 231x and 232x disposed on the other side continuously. More specifically, the coil 232x and the coil 231x which are disposed on one side with respect to the optical axis "L" are connected to the coil 232x and the coil 231x which are disposed on the other side with respect to the optical axis "L" in this order. Further, an intermediate terminal 254 is provided in the connecting wire which connects the coil 231x disposed on one side with respect to the optical axis "L" with the coil 232x which is connected with the coil 231x and disposed on the other side (see FIGS. 13(a) and 13(b)).

Photographing unit drive coils 230y which structure the second photographing unit drive mechanism 250y are structured of a coil 231y of the front side photographing unit drive mechanism 251y and a coil 232y of the rear side photographing unit drive mechanism 252y. The coils 231y and 232y are structured of two rectangular flat coils which are juxtaposedly arranged in the Z-axis direction and are respectively held by inner peripheral face portions facing in the X-axis direction of the body part 235 of the fixed cover 230. Two effective side parts located in the Z-axis direction of the coils 231y and 232y respectively face two pieces of the respective flat plate-shaped permanent magnets of the magnets 241y and 242y arranged in the Z-axis direction.

The coils 231y and 232y are wound around in the same directions as each other when viewed from the optical axis "L" and serially-connected from the coils 231y and 232y disposed on one side with respect to the optical axis "L" to the coils 231y and 232y disposed on the other side continuously. More specifically, the coil 232y and the coil 231y which are disposed on one side with respect to the optical axis "L" are connected to the coil 232y and the coil 231y which are disposed on the other side with respect to the optical axis "L" in this order. Further, an intermediate terminal 254 is also provided in the connecting wire which connects the coil 231y disposed on one side with respect to the optical axis "L" with the coil 232y which is connected with the coil 231y and disposed on the other side.

In this embodiment, the first photographing unit drive mechanism 250x and the second shake correction magnetic drive mechanism 250y are respectively provided with a first and a second energization control means which control energization to the photographing unit drive coils 230x and 230y on the basis of detection results by the shake detection sensor 182. The first energization control means controls current-supply to the coils 231x and 232x and the second energization control means controls current-supply to the coils 231y and coil 232y.

(Shake Correcting Operation)

Figure 13A:
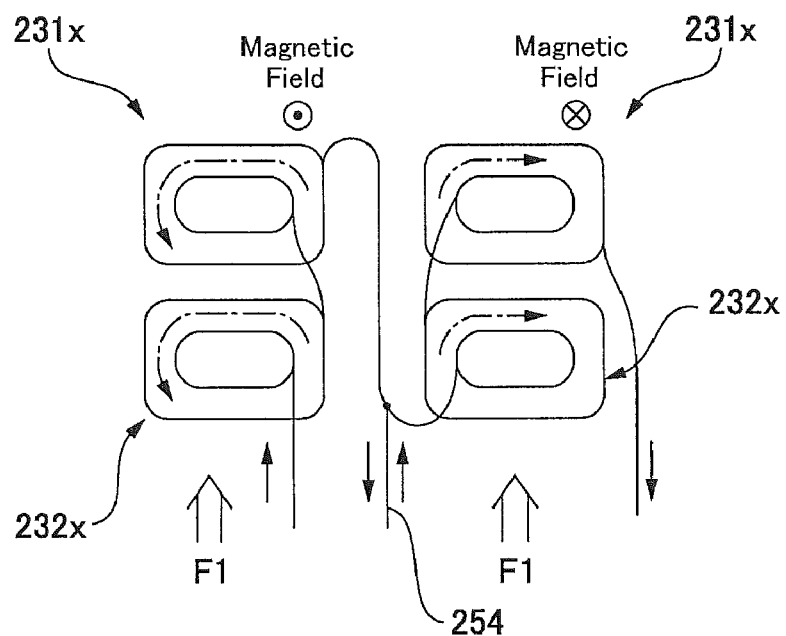
FIGS. 13(a) and 13(b) are explanatory views schematically showing an operation where an energization control means supplies an electric current to photographing unit drive coils in the third embodiment.
Figure 13B:
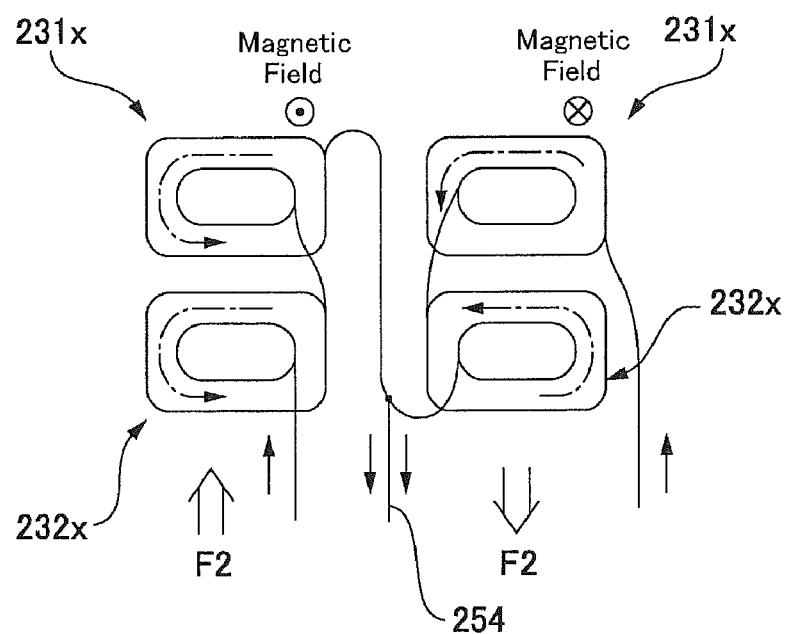

FIGS. 13(a) and 13(b) are explanatory views schematically showing an operation (first mode and second mode) where an energization control means supplies an electric current to a pair of photographing unit drive coils 230x. FIG. 13(a) is a view schematically showing a current flow when a thrust force for displacing the photographing unit 1 in the Z-axis direction is applied to the photographing unit 1 in the first mode, and FIG. 13(b) is a view schematically showing a current flow when a moment for rocking the photographing unit 1 in a direction intersecting the optical axis "L" is applied to the photographing unit 1 in the second mode. In FIGS. 13(a) and 13(b), only a pair of the photographing unit drive coils 230x are shown which are taken out and viewed from a separated position from the photographing unit 1 on one side of the optical axis "L". Therefore, although the two photographing unit drive coils 230x are wound around in the same direction as each other when viewed from the optical axis "L", in FIGS. 13(a) and 13(b), the two photographing unit drive coils 230x are expressed so as to be wound around in the opposite direction to each other.

First, as shown in FIG. 13(a), in the first mode, the energization control means supplies an electric current from the photographing unit drive coils 231x and 232x disposed on one side with respect to the optical axis "L" to the intermediate terminal 254 and supplies an electric current from the intermediate terminal 254 to the photographing unit drive coils 231x and 232x disposed on the other side with respect to the optical axis "L". As a result, electromagnetic forces are generated between the movable module drive coils 231x and 232x and the movable module drive magnets 241x and 242x and thus, as shown by the arrows "F1", two first photographing unit drive mechanisms 250x apply thrust forces for displacing the photographing unit 1 in the optical axis "L" direction. Similar operations are performed for the photographing unit drive coils 230y. Therefore, the photographing unit 1 which has been pressed toward the base 220 by the urging force of the flat spring 195 is moved in the Z-axis direction to be a state where the photographing unit 1 is capable of rocking.

Next, in the second mode for rocking the photographing unit 1 in a direction intersecting the optical axis "L" on the basis of a detection result of the shake detection sensor 182, as shown in FIG. 13(b), an electric current is supplied through the photographing unit drive coils 231x and 232x disposed on one side with respect to the optical axis "L" to the intermediate terminal 254 and an electric current is supplied through the photographing unit drive coils 231x and 232x disposed on the other side with respect to the optical axis "L" to the intermediate terminal 254. As a result, electromagnetic forces are generated between the photographing unit drive coils 231x and 232x and the movable module drive magnets 241x and 242x and thus, as shown by the arrows "F2", two first photographing unit drive mechanisms 250x apply moments for rocking the photographing unit 1 in a direction intersecting the optical axis "L". Similar operations are performed for the photographing unit drive coils 230y. Therefore, when the rocking operations around the X-axis and the Y-axis are combined, the photographing unit 1 can be rocked over the entire "XY" plane. Therefore, all shakes which may be occurred in a cellular phone with camera or the like can be corrected.

In this embodiment, a center of thrust forces for displacing an attitude of the photographing unit 1 by the first photographing unit drive mechanism 250x and the second photographing unit drive mechanism 250y, a center of restoring torque with which the flat spring 195 having been deformed by displacement of the attitude of the photographing unit 1 is going to return to its original shape, the gravity center of the photographing unit 1, and a rocking center of the photographing unit 1 are structured to be coincided with each other.

In accordance with an embodiment, even in a case that a winding direction of the photographing unit drive coil 230x and a magnetizing direction of the photographing unit drive magnet 240x are different from the structure described above, the first mode can be performed. In other words, when magnetizing directions of the photographing unit drive magnets 240x and current-supply directions of the respective movable module drive coils 230x are selected so that an electromagnetic force acting between the movable module drive coil 230x and the movable module drive magnet 240x disposed on one side with respect to the optical axis "L" and an electromagnetic force acting between the movable module drive coil 230x and the movable module drive magnet 240x on the other side with respect to the optical axis "L" are generated in the same direction as each other in the optical axis "L" direction, the first mode is performed. Similarly, when magnetizing directions of the photographing unit drive magnets 240x and current-supply directions of the respective movable module drive coils 230x are selected so that an electromagnetic force acting between the movable module drive coil 230x and the movable module drive magnet 240x disposed on one side with respect to the optical axis "L" and an electromagnetic force acting between the movable module drive coil 230x and the movable module drive magnet 240x on the other side with respect to the optical axis "L" are generated in the opposite direction to each other in the optical axis "L" direction, the second mode is performed.

(Principal Effects in this Embodiment)

According to this embodiment, the photographing unit 1 is supported by the flat spring 195 disposed between the front side photographing unit drive mechanisms 251x and 251y and the rear side photographing unit drive mechanisms 252x and 252y which are juxtaposedly disposed in the Z-axis direction. Therefore, a center of thrust forces for displacing an attitude of the photographing unit 1 by the first photographing unit drive mechanism 250x and the second photographing unit drive mechanism 250y and a center of restoring torque with which the flat spring 195 having been deformed by displacement of the attitude of the photographing unit 1 is going to return to its original shape, are disposed between the front side photographing unit drive mechanisms 251x and 251y and the rear side photographing unit drive mechanisms 252x and 252y. Further, these positions can be also coincided with each other between the front side photographing unit drive mechanisms 251x and 251y and the rear side photographing unit drive mechanisms 252x and 252y. Therefore, the rocking center of the photographing unit 1 can be disposed at a position in the vicinity of the flat spring 195. As a result, when the photographing unit 1 is rocked, a force acting on the flat spring 195 is smaller and thus the photographing unit drive mechanism is capable of rocking the photographing unit 1 with a small torque. Further, a spring force of the flat spring 195 which rockably supports the photographing unit 1 may not be required to be larger. Therefore, the photographing unit 1 can be displaced efficiently.

Further, according to this embodiment, the gravity center "G" of the photographing unit 1 is located between the front side photographing unit drive mechanisms 251x and 251y and the rear side photographing unit drive mechanisms 252x and 252y and located in the vicinity of the flat spring 195. Therefore, when an attitude of the photographic optical device 200B is varied, inclination of the photographing unit 1 with respect to the photographic optical device 200B can be reduced or prevented. As a result, a range that the photographing unit 1 is inclined due to an attitude of the photographic optical device 200B is not required to secure as a moving range of the photographing unit 1 and thus the size of the photographic optical device 200B is reduced. Further, magnetic drive forces generated by the first and the second photographing unit drive mechanisms 250x and 250y are not required to be varied due to an attitude of the photographic optical device 200B and thus the photographing unit 1 is displaced efficiently. Further, since a moving range of the photographing unit 1 is smaller, for example, when a restriction member for restricting the moving range of the photographing unit 1 is disposed, a gap space between the photographing unit 1 and the restriction member can be made narrower. As a result, even in a case that the photographing unit 1 is collided with the restriction member when an impact or the like is applied to the photographic optical device 200B, the occurred impact becomes smaller and thus deformation of the photographing unit 1 can be prevented. Therefore, the photographic optical device 200B can be structured as an impact-resistant device. In addition, since a structure for supporting the photographing unit 1 is not required on an outer side in the Z-axis direction of the photographing unit 1, the photographic optical device 200B can be structured thinner in the Z-axis direction.

Further, the flat spring 195 is capable of deforming around the X-axis, around the Y-axis, and in the Z-axis direction and the photographing unit 1 is supported so as to be capable of displacing around the X-axis, around the Y-axis, and in the Z-axis direction. Therefore, in a case that the center of the thrust forces by the first and the second photographing unit drive mechanisms 250x and 250y, the center of the restoring torque by the flat spring 195, and the center of the photographing unit 1 are located nearer to each other, when a strong impact is applied to the photographic optical device 200B, the photographing unit 1 may be moved in a wide range. However, the photographing unit 1 is hard to be moved in the X-axis direction and the Y-axis direction. Further, since the arm parts 195d are deformed following displacement of the photographing unit 1 in the Z-axis direction, the flat spring 195 is not damaged.

Further, according to this embodiment, the photographing unit 1 is capable of rocking around the X-axis and around the Y-axis and the photographing unit 1 is capable of moving in the Z-axis direction by means of that current-supplies to the coils 231x, the coils 232x, the coils 231y and the coils 232y of the first and the second photographing unit drive mechanisms 250x and 250y are controlled by the energization control means. In addition, when the first and the second photographing unit drive mechanisms 250x and 250y are not operated, the photographing unit 1 is pressed against the base by the flat spring 195 and, when the shake correction mechanism is operated, the first and the second photographing unit drive mechanisms 250x and 250y generate magnetic drive forces for separating the photographing unit 1 from the base against the urging force of the flat spring 195. As a result, during that the first and the second photographing unit drive mechanisms 250x and 250y are not operated such that the photographic optical device 200B is carried, the photographing unit 1 is fixed to the base 220 and is not moved. Therefore, a problem is prevented that, when the photographic optical device 200B is carried or the like, the photographing unit 1 and the fixed body 210 are collided with each other by vibration applied to the photographic optical device 200B to occur an abnormal noise or the like such as rattling.

(Modified Example of Third Embodiment)

In the embodiment described above, when the photographing unit drive mechanism is not operated, the flat spring 195 applies the urging force for pressing the photographing unit 1 against the base. However, the urging force may be applied by a mechanical spring such as a flat spring which is different from the flat spring 195. Further, a magnetic spring may be structured so that a magnetic body is disposed on the fixed body 210 for generating a magnetic attraction force between the photographing unit drive magnets and the magnetic body and the urging force pressing the photographing unit 1 against the base is applied by the magnetic spring.

Fourth Embodiment

Figure 14A:
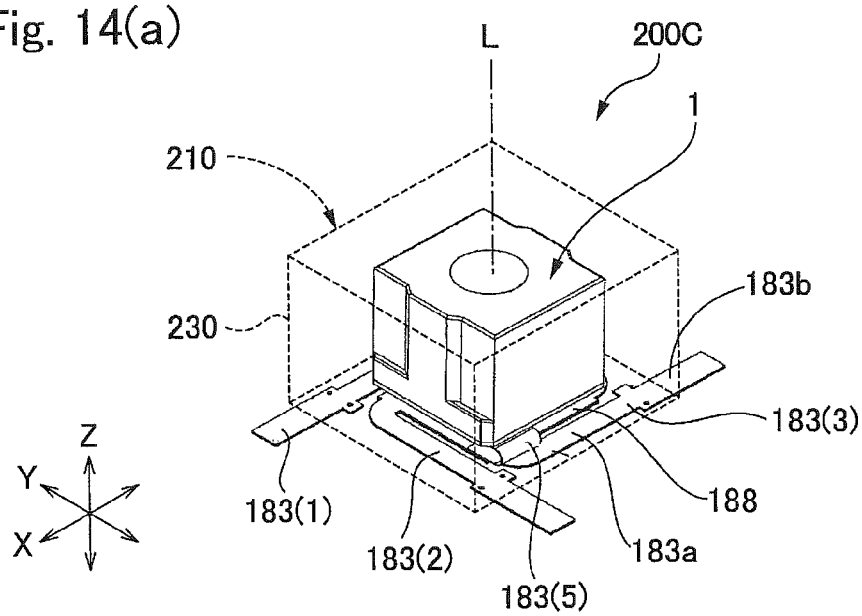
FIG. 14(a) is a perspective view showing a photographic optical device in accordance with a fourth embodiment of the present invention which is viewed from obliquely above on an object to be photographed side.
Figure 14B:
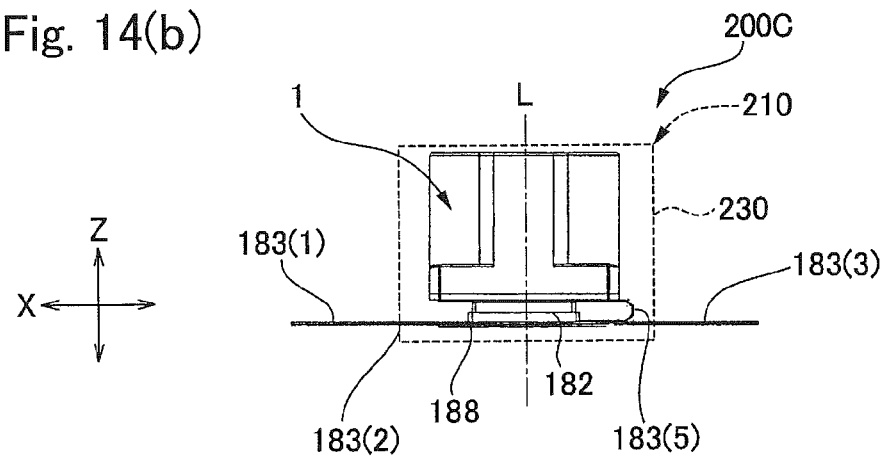
FIG. 14(b) is its side view.
Figure 14C:
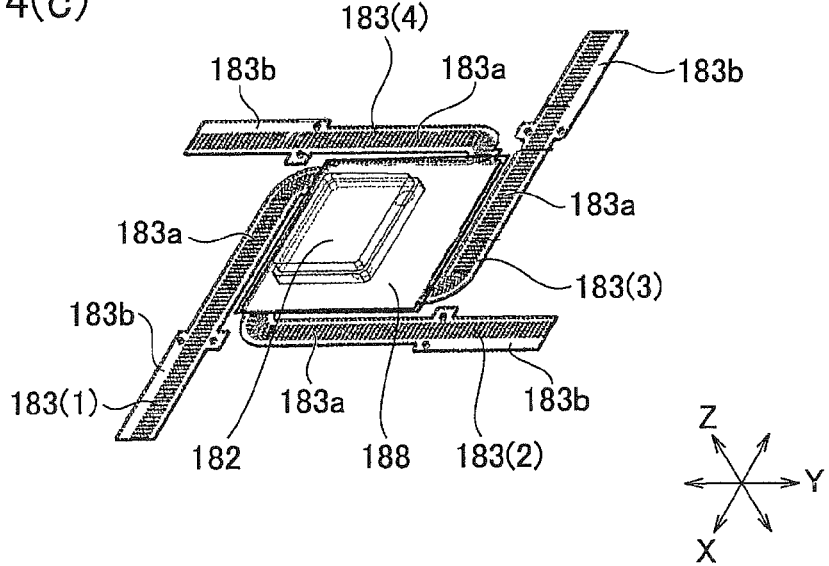
FIG. 14(c) is a fragmentary perspective view showing a flexible printed circuit board.

FIG. 14(*a*) is a perspective view showing a photographic optical device in accordance with a fourth embodiment of the present invention which is viewed from obliquely above on an object to be photographed side, FIG. 14(*b*) is its side view, and FIG. 14(*c*) is a fragmentary perspective view showing a flexible printed circuit board and the like. In FIGS. 14(*a*) and 14(*b*), the fixed body 210 is shown with a dotted line so that a support structure for the photographing unit 1 is easily understood.

A photographic optical device 200C in this embodiment uses a wiring member having elasticity as a spring member for supporting the photographing unit 1. More specifically, a flexible printed circuit board 183 for supplying electric power and for transmitting signals between the photographing unit 1 and the shake detection sensor 182 and an external equipment is adopted as the spring member. In this embodiment, the photographic optical device 200C is provided with the similar structure to the photographic optical device in accordance with the second embodiment except the support structure for the photographing unit 1. Therefore, the support structure for the photographing unit will be described below and other descriptions are omitted.

(Support Structure for Photographing Unit)

As shown in FIG. 14(*a*), the photographing unit 1 is formed in a rectangular shape when viewed in the optical axis "L" direction. A shake detection sensor 182 and a rectangular plate 188 to which the shake detection sensor 182 is fixed are attached to a rear side of the photographing unit 1. Four pieces of flexible printed circuit boards 183(1) through 183(4) connected with the shake detection sensor 182 are drawn out from the vicinities of respective corner portions of the plate 188. A relaying flexible printed circuit board 183(5) for supplying electric power and for transmitting signals between the photographing unit 1 and the external equipment is drawn out from the photographing unit 1. The relaying flexible printed circuit board 183(5) is connected with a lead-out portion of the flexible printed circuit board 183(3) after having been bent in a "C"-shape in the Z-axis direction.

Four pieces of the flexible printed circuit boards 183(1) through 183(4) are respectively provided with a constant narrower width portion 183*a*, which is extended in the X-axis direction or in the Y-axis direction along an outer circumferential edge of the plate 188 and an outer peripheral wall of the photographing unit 1, and a wider portion 183*b* which is formed from an end portion of the constant narrower width portion 183*a*. The wider portion 183*b* is attached to the fixed cover 230. The photographing unit 1 is supported by the four pieces of the flexible printed circuit boards 183(1) through 183(4) so as to be capable of displacing around the X-axis, around the Y-axis, in the X-axis direction, in the Y-axis direction and in the Z-axis direction.

In order to secure a desired spring constant in each of the flexible printed circuit boards 183(1) through 183(4), material having a high rigidity may be used as a film-shaped insulator structuring the flexible printed circuit boards 183(1) through 183(4), or the number of layers formed in its thickness direction may be increased. Further, when attaching positions of the wider portions 183*b* to the fixed cover 230 are located at a nearer position to respective corner portions of the plate 188 and the lengths of the constant narrower width portions 183*a* are shortened, the spring constant is increased. In addition, when the shape of copper foil or the thickness of copper foil of the flexible printed circuit board 183 is changed, a desired spring constant can be secured. Further, a spring constant of each of the flexible printed circuit boards 183(1) through 183(4) can be secured by means of that a separate component made of metal or resin is attached to each of the flexible printed circuit boards 183(1) through 183(4).

Further, when each of the flexible printed circuit boards 183(1) through 183(4) is formed in one layer structure, a desired spring constant may be secured by means of that wiring patterns are disposed on one side face and the other entire side face is disposed with copper foil or the other side face is stuck with a metal plate. In these cases, the copper foil and the metal plate function also as an electromagnetic shield. In accordance with an embodiment, four pieces of the flexible printed circuit boards 183(1) through 183(4) may include a dummy flexible printed circuit board which is not used for supplying electric power and for transmission of signals.

(Principal Effects in this Embodiment)

According to the photographic optical device 200C in this embodiment, the photographing unit 1 is supported by the flexible printed circuit boards 183(1) through 183(4) for supplying electric power to the shake detection sensor 182 and the imaging element and for transmitting signals between the shake detection sensor 182 and the imaging element and the external apparatus and thus a spring member is not required. Therefore, the structure of the photographic optical device 200C can be simplified. Further, the flexible printed circuit boards 183(1) through 183(4) are provided with an adhesive layer and thus a dumping effect is obtained by the adhesive layer.

(Embodiment with Structure for Preventing Magnetic Flux Leakage to the Outside)

Figure 15:
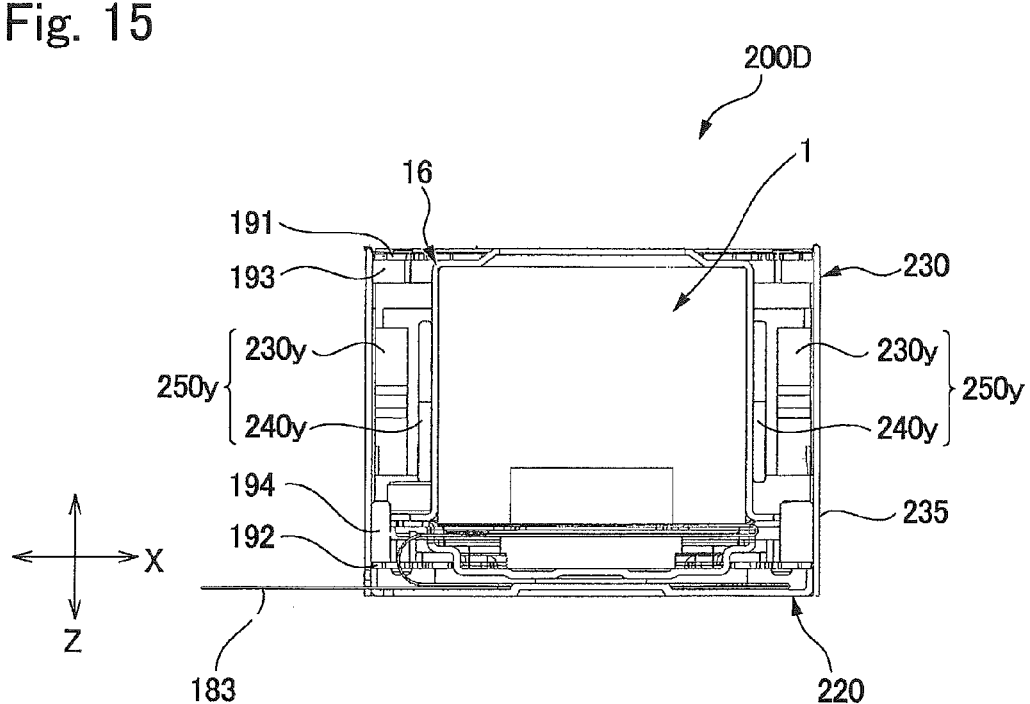
[FIG. 15]
Figure 16:
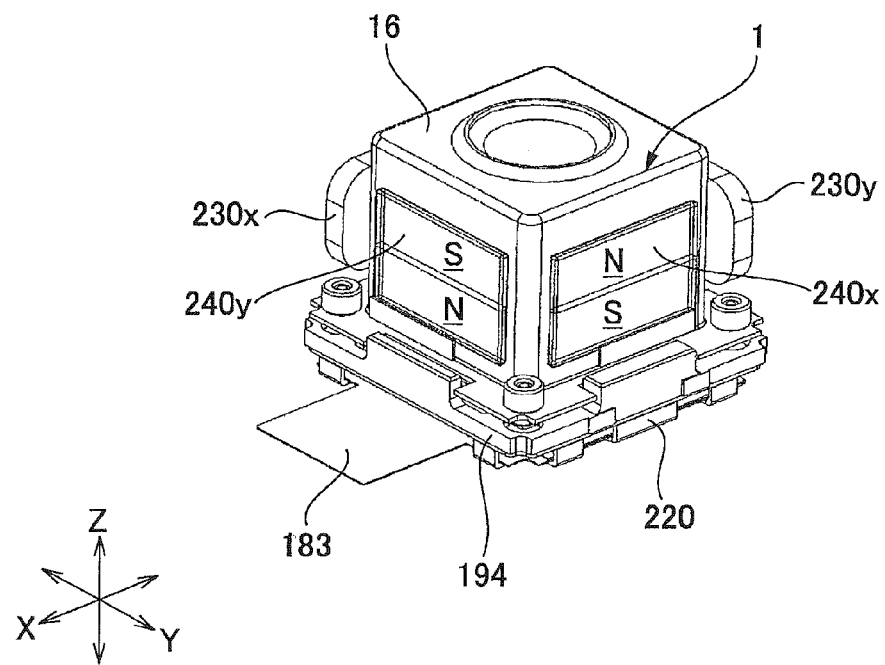
[FIG. 16]

In the first through the fourth embodiments, material for forming the fixed cover 230 and the base 220 is not specified but, when the fixed cover 230 and the base 220 are formed of magnetic material, magnetic flux leakage from the first and the second photographing unit drive mechanisms 250*x* and 250*y* to the outside is prevented. Further, the outside magnetic flux is prevented from entering into the first and the second photographing unit drive mechanisms 250*x* and 250*y* and thus an effect given to an attitude of the photographing unit 1 can be reduced. FIG. 15 is a longitudinal sectional view showing a photographic optical device in which the fixed cover 230 and the base 220 are formed of magnetic material. FIG. 16 is a perspective view showing the photographic optical device in FIG. 15 in which the fixed cover 230, parts of photographing unit drive coils 230*x* and 230*y*, the first spring 191 and the frame body 193 and the like are detached and which is viewed from obliquely above on an object to be photographed side. The photographic optical device in accordance with this embodiment is provided with corresponding portions to the photographic optical device 200B in accordance with the second embodiment and thus the same reference signs are used in the corresponding portions and their descriptions are omitted.

A photographic optical device 200D shown in FIG. 15 is a structural example in which the fixed cover 230 and the base 220 are formed of magnetic material. The fixed cover 230 is provided with only a rectangular tube-shaped body part 235.

According to this example, since the outer peripheral side and the rear side of the first and the second photographing unit drive mechanisms 250x and 250y are covered by the fixed cover 230 made of magnetic material, leakage flux from the first and the second photographing unit drive mechanisms 250x and 250y to the outside is reduced. Further, since the fixed cover 230 functions as a flux concentrating yoke, interlinkage flux interlinking with the photographing unit drive coils 230x and 230y is increased and thus, when an attitude of the photographing unit 1 is to be displaced by the first and the second photographing unit drive mechanisms 250x and 250y, a large thrust force can be obtained. Therefore, responsiveness to a shake is superior. In addition, the outside magnetic flux is prevented from entering into the first and the second photographing unit drive mechanisms 250x and 250y and thus an effect given to an attitude of the photographing unit 1 can be reduced.

When the fixed cover 230 is formed of magnetic material, a magnetic attraction force is generated between the photographing unit drive magnets 240x and 240y attached to the photographing unit 1 and the fixed cover 230, and the magnetic attraction force may affect the displacement of the photographing unit 1 by the shake correction mechanism.

In order to prevent this situation, in this embodiment, as shown in FIG. 16, the photographing unit drive magnet 240x of the first photographing unit drive mechanism 250x and the photographing unit drive magnet 240y of the second photographing unit drive mechanism 250y which are adjacent to each other around the Z-axis are disposed so that the magnetic poles in the Z-axis direction are different from each other. When disposed as described above, magnetic flux occurs between the photographing unit drive magnets 240x and 240y which are adjacent to each other around the Z-axis and thus magnetic flux passing through the fixed cover 230 is decreased. As a result, a magnetic attraction force generated between the fixed cover 230 and the photographing unit drive magnets 240x and 240y can be made smaller and thus an effect given to displacement of the photographing unit 1 due to the magnetic attraction force is reduced.

Further, when the fixed cover 230 made of magnetic material is provided with an upper plate part, a magnetic attraction force between the photographing unit drive magnets 240x and 240y attached to the photographing unit 1 and the fixed cover 230 may act on the upper plate part to urge the photographing unit 1 in the "Z" direction. On the other hand, in this embodiment, since the upper plate part is removed from the fixed cover 230, the photographing unit 1 is prevented from being urged in the "Z" direction by the magnetic attraction force. Therefore, effect given to displacement of photographing unit 1 due to the magnetic attraction force can be reduced. Similarly, when the base 220 is formed of magnetic material, a magnetic attraction force is generated between the photographing unit drive magnets 240x and 240y attached to the photographing unit 1 and the base 220. In order to prevent this urging toward a lower side in the "Z" direction due to the magnetic attraction force, the base 220 may be formed of nonmagnetic material.

When the fixed cover 230 is formed of magnetic material, a magnetic attraction force is generated between the photographing unit drive magnets 240x and 240y attached to the photographing unit 1 and the fixed cover 230. Therefore, when the center of the photographing unit drive magnets 240x and 240y in the Z-axis direction and the center of the fixed cover 230 in the Z-axis direction are shifted from each other, a magnetic attraction force is generated by which the photographing unit 1 is attracted toward either direction in the Z-axis direction.

Further, in the photographic optical device 200D in this embodiment, since the upper plate part of the fixed cover 230 is removed, when the positions of the fixed cover 230 and the photographing unit 1 are adjusted at the time of assembling of the photographic optical device 200D, a gap space between the fixed cover 230 and the photographing unit 1 is monitored from an object to be photographed side by using an image sensor or the like and a working operation can be performed while confirming their positional relationship and, as a result, assembling with a high degree of positional accuracy is attained.

Figure 17:
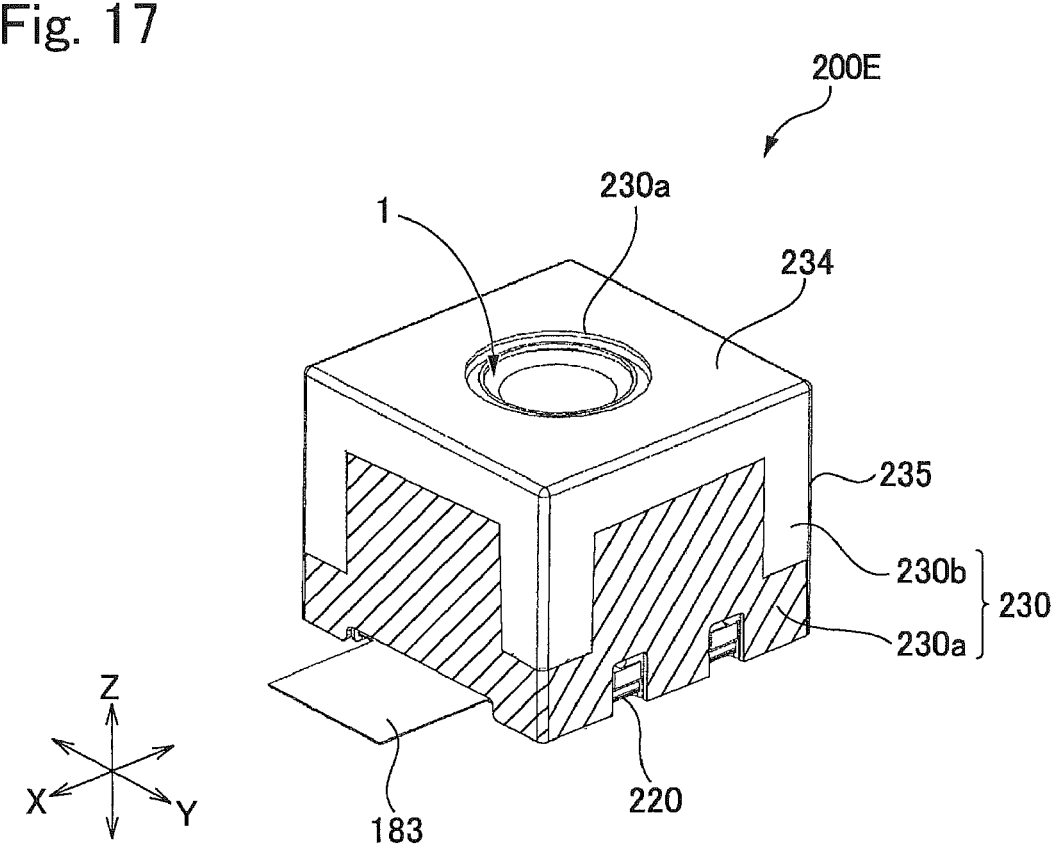
[FIG. 17]

Next, FIG. 17 is a perspective view showing a photographic optical device in which a part of the fixed cover 230 is formed of magnetic material and its remaining portion is formed of nonmagnetic material. In a photographic optical device 200E in this embodiment, when viewed in a direction perpendicular to the optical axis "L", a portion (slanted line portion in the drawing) 230a of the fixed cover 230 including a moving region which is overlapped with a range where the photographing unit drive magnet is moved is formed of magnetic material and the other remaining portion 230b of the fixed cover 230 is formed of nonmagnetic material. Therefore, the fixed cover 230 is provided with a first cover portion formed of nonmagnetic material (portion 230b) and a second cover portion formed of magnetic material (portion 230a).

Even in the structure as described above, the portion of the fixed cover 230 formed of magnetic material covers the first and the second photographing unit drive mechanisms 250x and 250y from the outer peripheral side and thus leakage flux from the first and the second photographing unit drive mechanisms 250x and 250y to the outside is reduced. Further, since the fixed cover 230 acts as a flux concentrating yoke, interlinkage flux interlinking with the photographing unit drive coils 230x and 230y is increased and thus a large thrust force is obtained when an attitude of the photographing unit 1 is to be displaced by the first and the second photographing unit drive mechanisms 250x and 250y. Therefore, responsiveness to a shake is superior. In addition, the outside magnetic flux is prevented from entering into the first and the second photographing unit drive mechanisms 250x and 250y and thus an effect given to an attitude of the photographing unit 1 can be reduced.

In accordance with an embodiment, a portion formed of magnetic material and a portion formed of nonmagnetic material may be structured as separate components and they are combined to structure the fixed cover 230 and alternatively, they may be structured as a one-piece molded product. Further, instead of that the portion 230a including a moving region overlapping with a range where the photographing unit drive magnet is moved when viewed in a direction perpendicular to the optical axis "L" is formed of magnetic material, a plate shaped magnetic body may be attached to this portion from the outside of the fixed cover 230. Well-known material such as iron may be used as the magnetic body.

Next, a structural example of a photographic optical device will be shown in which a shape of the yoke 16 of the photographing unit 1 is modified to prevent magnetic flux leakage from the first and the second photographing unit drive mechanisms 250x and 250y to the outside and, in addition, outside magnetic flux is prevented from entering into the first and the second photographing unit drive mechanisms 250x and 250y so that effect given to an attitude of the photographing unit 1 is reduced.

Figure 18:
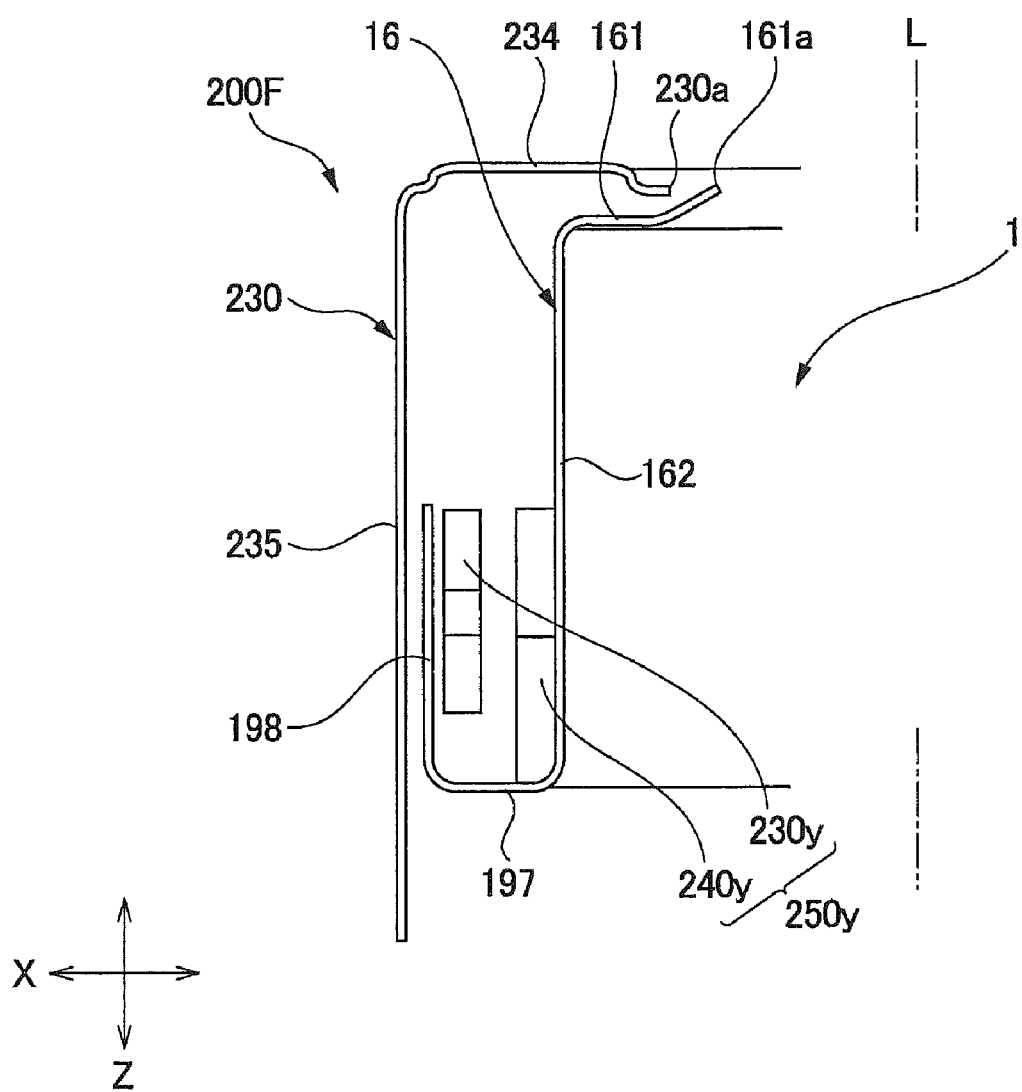
[FIG. 18]

FIG. 18 is a longitudinal sectional view schematically showing the yoke 16 and the like of a photographic optical device in this embodiment which is cut by the "X-Z" plane. In the photographic optical device 200F, the yoke 16 is provided with a rectangular top plate part 161 on an object to be photographed side which is formed at its center with an opening part 161*a*, four side plate parts 162 extended to a rear side from an outer circumferential edge of the top plate part 161, a relay plate portion 197 which is bent to an outer peripheral side at a lower end edge of the side plate part 162, and a coil side flux concentrating yoke portion 198 which is bent to a front side from an outer circumferential edge of the relay plate portion 197. Its cross-sectional shape is in a "U"-like shape. The photographing unit drive coils 230*x* and 230*y* are attached to the fixed cover 230 so that a gap space is provided between the fixed cover 230 and the photographing unit drive coils 230*x* and 230*y* in a direction perpendicular to the optical axis "L". The coil side flux concentrating yoke portion 198 faces the photographing unit drive magnets 240*x* and 240*y* in the gap space on the opposite side to the photographing unit drive magnets 240*x* and 240*y* so as to interpose the photographing unit drive coils 230*x* and 230*y* therebetween. In this embodiment, the fixed cover 230 is formed of nonmagnetic material.

According to this example, the photographing unit drive magnets 240*x* and 240*y* and the photographing unit drive coils 230*x* and 230*y* of the first and the second photographing unit drive mechanisms 250*x* and 250*y* are surrounded by the yoke 16 and thus leakage flux from the first and the second photographing unit drive mechanisms 250*x* and 250*y* can be reduced. Further, since interlinkage flux interlinking with the photographing unit drive coils 230*x* and 230*y* is increased, when an attitude of the photographing unit 1 is displaced by the first and the second photographing unit drive mechanisms 250*x* and 250*y*, a large thrust force can be got. Therefore, responsiveness to a shake is superior. In addition, the outside magnetic flux is prevented from entering into the first and the second photographing unit drive mechanisms 250*x* and 250*y* and thus an effect given to an attitude of the photographing unit 1 can be reduced.

In accordance with an embodiment, when the rocking center of the movable unit is located on the lower side in the Z-axis direction with respect to the movable unit, the longitudinal sectional shape of the respective photographing unit drive coils 230*x* and 230*y* is set to be a trapezoid shape whose lower side is longer. Further, when the rocking center of the movable unit is located in a range overlapping with the movable unit in the Z-axis direction, the longitudinal sectional shape of the respective photographing unit drive coils 230*x* and 230*y* is set to be a rectangular shape.

(Other Embodiments)

In the embodiment described above, in both of the first photographing unit drive mechanism 250*x* and the second photographing unit drive mechanism 250*y*, it is structured that a magnet (photographing unit drive magnets 240*x* and 240*y*) is held on the photographing unit 1 side which is the movable body side, and that a coil (photographing unit drive coils 230*x* and 230*y*) is held on the fixed body 210 side. However, it may be structured that the photographing unit drive coil is held on the photographing unit 1 side which is the movable body side and that the photographing unit drive magnet is held on the fixed body 210 side.

In the embodiment described above, the photographing unit 1 is displaced in the X-axis direction by the first photographing unit drive mechanism 250*x* and the photographing unit 1 is displaced in the Y-axis direction by the second photographing unit drive mechanism 250*y*. However, the photographing unit drive magnets and the photographing unit drive coils may be disposed so that the photographing unit 1 is displaced in the Y-axis direction by the first photographing unit drive mechanism 250*x* and the photographing unit 1 is displaced in the X-axis direction by the second photographing unit drive mechanism 250*y*.

Further, in the embodiment described above, the photographing unit drive magnet is structured so that two pieces of magnets magnetized with one pole are juxtaposed so that magnetizing directions are opposite to each other but one piece of magnet magnetized with two poles may be used.

Further, in the embodiment described above, both of the first photographing unit drive mechanism 250*x* and the second photographing unit drive mechanism 250*y* are provided for the photographing unit 1. However, in order to correct only a shake in a direction where a shake is easily occurred when used by a user, at least an embodiment of the present invention may be applied to a case that only one of the first photographing unit drive mechanism 250*x* and the second photographing unit drive mechanism 250*y* is provided.

In the embodiment described above, the present invention is applied to the photographic optical device 200 which uses the photographing unit 1 whose lens drive coils 30*s* and 30*t* are formed in a rectangular tube shape and whose lens drive magnet 17 is formed in a flat plate shape. However, at least an embodiment of the present invention may be applied to a photographic optical device which uses a photographing unit whose lens drive coils 30*s* and 30*t* are formed in a cylindrical shape, whose case 18 is formed in a rectangular tube shape, and in which lens drive magnets 17 are disposed at corner portions of the case 18.

In the embodiment described above, the present invention is applied to the photographic optical device 200 which is used in a cell phone with camera but at least an embodiment of the present invention may be applied to the photographic optical device 200 which is used in a thin digital camera or the like. Further, in the embodiment described above, in addition to the lens 121 and the imaging element 155, the lens drive mechanism 5 for magnetically driving the movable body 3 including the lens 121 in the optical axis direction is supported on the support body 2 in the photographing unit 1. However, at least an embodiment of the present invention may be applied to a fixed focus type photographic optical device on which the lens drive mechanism 5 is not mounted on the photographing unit 1. Further, in the embodiment described above, the photographing unit provided with a lens and an imaging element is described as a movable module. However, at least an embodiment of the present invention may be applied to an optical unit provided with at least a lens as a movable module and, for example, a laser pointer, a portable projection display device and an on-vehicle projection display device are included in the optical unit.

In addition, in the embodiment described above, the lens drive mechanism 5 magnetically drives the movable body 3 including the lens 121 in the optical axis direction but a lens drive mechanism may be adopted which drives the movable body 3 including the lens 121 in the optical axis direction by using a piezo-electric element. As a lens drive mechanism with the use of a piezo-electric element, for example, it may be structured that a piezo-electric element formed in a cylindrical shape is a stator, a rotor is pressed against a ring-shaped end face of the stator, an alternating current having a high frequency is supplied to the piezo-electric element, ultrasonic vibration is generated in the stator to rotate the rotor, and rotational motion of the rotor is converted into linear motion to move the movable body in the optical axis direction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. An optical unit with shake correcting function comprising:
   a movable module in which at least a lens is supported on a support body; and
   a fixed body which supports the movable module;
   wherein the movable module is supported on the fixed body so as to be displaceable in a direction intersecting an optical axis of the lens; and
   wherein a movable module drive mechanism is provided at two positions, with the optical axis interposed therebetween, between the movable module and the fixed body and the movable module drive mechanism is structured to generate magnetic drive force to displace the movable module in a direction intersecting the optical axis;
   wherein the movable module is an image-pickup unit in which an imaging element is held by the support body,
   the lens is included in a movable body which is movably supported on the support body in the optical axis direction,
   the lens drive mechanism which magnetically drives the movable body in the optical axis direction is supported on the support body in the movable module,
   movable module drive magnets are held by the movable module and the movable module drive coils are held by the fixed body,
   the movable module is provided with a cover part surrounding the movable body on an outer peripheral side,
   the lens drive mechanism is provided with a lens drive coil which is held by an outer peripheral face of the movable body and a lens drive magnet which is held by an inner peripheral face of the cover part, and
   the movable module drive magnets are held by an outer peripheral face of the cover part;
   wherein three directions perpendicular to each other are set to be an X-axis, a Y-axis and a Z-axis, and a direction along the optical axis is set to be the Z-axis,
   the movable module drive mechanism comprises between the movable module and the fixed body:
   a first movable module drive mechanism provided at two positions and aligned in an X-axis direction with the optical axis interposed therebetween, and structured to generate magnetic force to rock the movable module on the fixed body in one of the X-axis direction and a Y-axis direction, and
   a second movable module drive mechanism provided at two positions and aligned in a Y-axis direction with the optical axis interposed therebetween, and structured to generate magnetic force to rock the movable module on the fixed body in an other of the X-axis direction and the Y-axis direction.

2. The optical unit with shake correcting function according to claim 1, wherein the movable module is supported by the fixed body through a spring member which is connected with the movable module and the fixed body.

3. The optical unit with shake correcting function according to claim 2, wherein the spring member is a gimbal spring which is provided with an inner peripheral side connecting part connected with the movable module, an outer peripheral side connecting part connected with the fixed body, and a plurality of arm parts extended from the inner peripheral side connecting part to be connected with the outer peripheral side connecting part.

4. The optical unit with shake correcting function according to claim 1, further comprising an urging means which presses the movable module against the fixed body in the optical axis direction,
   wherein when the movable module is to be displaced in the direction intersecting the optical axis, the movable module drive mechanism generates a drive force for separating the movable module from the fixed body against an urging force of the urging means.

5. The optical unit with shake correcting function according to claim 4, wherein the urging means is provided with at least one of a mechanical spring which is connected with the movable module and the fixed body and a magnetic spring which utilizes the movable module drive magnet or another magnet.

6. The optical unit with shake correcting function according to claim 1, wherein magnetic poles of the movable module drive magnets adjacent to each other around the optical axis are different from each other.

7. The optical unit with shake correcting function according to claim 1, wherein the movable module drive mechanism is structured to rock the movable module on the fixed body on a basis of a detection result of a shake detection sensor which detects inclination of the movable module.

8. The optical unit with shake correcting function according to claim 1, wherein
   three directions perpendicular to each other are set to be an X-axis, a Y-axis and a Z-axis, and a direction along the optical axis is set to be the Z-axis,
   the movable module drive mechanism comprises between the movable module and the fixed body:
   a first movable module drive mechanism provided at two positions and aligned in an X-axis direction with the optical axis interposed therebetween, and structured to generate magnetic force to displace the movable module in one of the X-axis direction and a Y-axis direction, and
   a second movable module drive mechanism provided at two positions and aligned in a Y-axis direction with the optical axis interposed therebetween, and structured to generate magnetic force to displace the movable module in an other of the X-axis direction and the Y-axis direction.

9. The optical unit with shake correcting function according to claim 8, wherein the movable module is supported by the fixed body through a spring member which is connected with the movable module and the fixed body.

10. The optical unit with shake correcting function according to claim 9, wherein the spring member is a gimbal spring which is provided with an inner peripheral side connecting part connected with the movable module, an outer peripheral side connecting part connected with the fixed body, and a plurality of arm parts extended from the inner peripheral side connecting part to be connected with the outer peripheral side connecting part.

11. The optical unit with shake correcting function according to claim 8, further comprising an urging means which presses the movable module against the fixed body in the optical axis direction,
   wherein when the movable module is to be displaced in the direction intersecting the optical axis, the movable module drive mechanism generates a drive force for separating the movable module from the fixed body against an urging force of the urging means.

12. The optical unit with shake correcting function according to claim 11, wherein the urging means is provided with at least one of a mechanical spring which is connected with the movable module and the fixed body and a magnetic spring which utilizes the movable module drive magnet or another magnet.

13. The optical unit with shake correcting function according to claim 8, wherein the movable module is an image-pickup unit in which an imaging element is held by the support body.

14. The optical unit with shake correcting function according to claim 13, wherein
the lens is included in a movable body which is movably supported on the support body in the optical axis direction,
a lens drive mechanism for driving the movable body in the optical axis direction is supported on the support body in the image-pickup unit.

15. The optical unit with shake correcting function according to claim 14, wherein the lens drive mechanism magnetically drives the movable body in the optical axis direction.

16. The optical unit with shake correcting function according to claim 8, wherein the movable module drive magnet is held by the movable module and the movable module drive coil is held by the fixed body.

17. The optical unit with shake correcting function according to claim 8, wherein magnetic poles of the movable module drive magnets adjacent to each other around the optical axis are different from each other.

18. The optical unit with shake correcting function according to claim 8, wherein the movable module drive mechanism is structured to rock the movable module on the fixed body on a basis of a detection result of a shake detection sensor which detects inclination of the movable module.

\* \* \* \* \*